(12) United States Patent
Gladieux

(10) Patent No.: US 6,401,100 B1
(45) Date of Patent: Jun. 4, 2002

(54) METHOD FOR ASSOCIATING CLASSES CONTAINED IN THE SAME OR DIFFERENT MODELS

(75) Inventor: Ted Franklin Gladieux, Irvine, CA (US)

(73) Assignee: Unisys Corp., Blue Bell, PA (US)

( * ) Notice: Subject to any disclaimer, the term of this patent is extended or adjusted under 35 U.S.C. 154(b) by 0 days.

(21) Appl. No.: 09/208,317

(22) Filed: Dec. 9, 1998

(51) Int. Cl.$^7$ .............................................. G06F 17/30
(52) U.S. Cl. ...................................... 707/103; 707/206
(58) Field of Search .............................. 707/103, 101, 707/102, 206; 717/1, 4, 10

(56) References Cited

U.S. PATENT DOCUMENTS

| | | | | |
|---|---|---|---|---|
| 5,481,718 A | * | 1/1996 | Ryu et al. .................... | 707/103 |
| 5,557,793 A | * | 9/1996 | Koerber ....................... | 707/103 |
| 5,581,755 A | * | 12/1996 | Koerber et al. .............. | 707/103 |
| 5,615,367 A | * | 3/1997 | Bennett et al. .............. | 707/102 |
| 5,644,764 A | * | 7/1997 | Johnson et al. ............. | 707/103 |
| 5,671,398 A | * | 9/1997 | Neubauer .................... | 707/203 |
| 5,701,472 A | * | 12/1997 | Koerber et al. ............. | 707/203 |
| 5,721,925 A | * | 2/1998 | Cheng et al. ................ | 707/103 |
| 5,758,348 A | * | 5/1998 | Neubauer .................... | 707/103 |
| 5,765,039 A | * | 6/1998 | Johnson ....................... | 395/682 |
| 5,893,912 A | * | 4/1999 | Freund et al. ............... | 707/103 |
| 5,937,410 A | * | 8/1999 | Shen ............................ | 707/103 |
| 6,026,428 A | * | 2/2000 | Hutchison et al. .......... | 709/108 |
| 6,128,772 A | * | 10/2000 | Baisley ......................... | 717/3 |
| 6,182,277 B1 | * | 1/2001 | DeGroot et al. .............. | 717/1 |
| 6,202,066 B1 | * | 3/2001 | Barkley et al. ................ | 707/9 |
| 6,219,678 B1 | * | 4/2001 | Yelland et al. .............. | 707/206 |

* cited by examiner

*Primary Examiner*—Frantz Coby
(74) *Attorney, Agent, or Firm*—Alfred W. Kozak; Mark T. Starr; Lise A. Rode

(57) ABSTRACT

A method for associating classes contained in models stored in a computer system memory. The computer system has a repository program operating therein, which executes this method beginning with the step of initializing each persistent type object in one of the models. For each persistent type object initialized in the preceding step, a determination is made if the persistent type object is an association type. If it is, then at least two association-end objects are created. Next, the association-end objects are added to a collection of features owned by the persistent type object. The method further includes the steps of creating association objects that connect objects defined by persistent types associated by one of the association types; calling a setProperty function to specify an association between a first object and a collection of objects; passing to the setProperty function one of the two association end objects; the setProperty function interpreting the definition of the association type that owns the association-end parameter in order to determine whether: the association type is a valid association for associating objects of the persistent type which defines the target object; the association type is a valid association for associating objects of the persistent type which defines the value object; and, if the setProperty function determines that an association can be made, constructing association instance objects to link the target object to the value object.

18 Claims, 33 Drawing Sheets

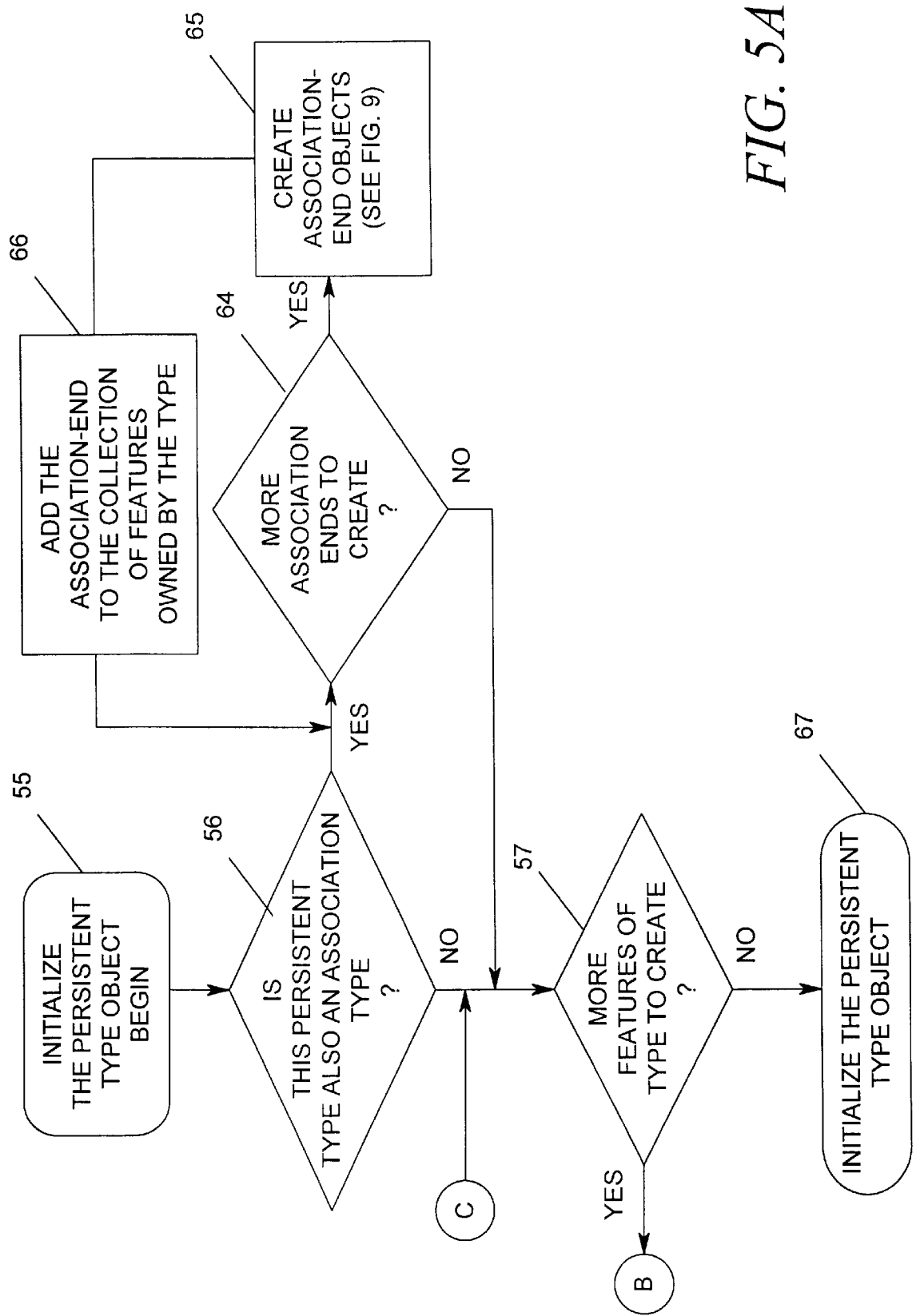

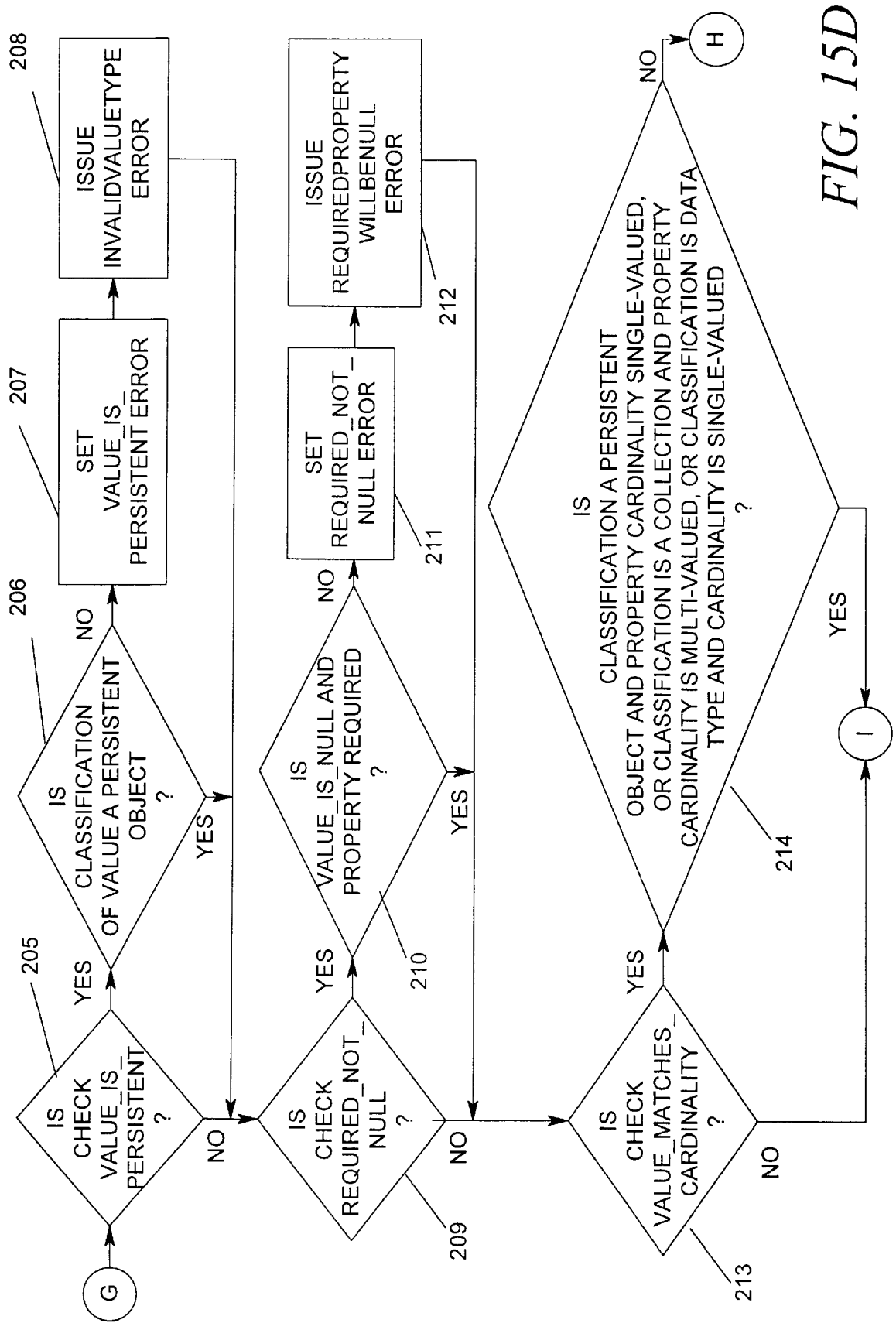

METHOD FOR ASSOCIATING CLASSES CONTAINED IN THE SAME OR DIFFERENT MODELS

FIELD OF THE INVENTION

The present invention generally relates to an object-oriented method and system for modeling and in particular it relates to a method and system for associating objects in models or between disparate models.

BACKGROUND OF THE INVENTION

The storage and manipulation of data records or objects within a database application is well known in the prior art. A database allows one to store information in it; and it does not necessarily have any special meaning associated with the things that are stored in the database. A repository not only uses the database as a data store, but it is a layer above a database. A repository has information about the things stored in the database. Stated otherwise, a repository is like a card catalog that is found in the library, with the library being analogous to a database.

With the advent of repositories, improvements in the accessibility of data within databases has improved. However, as these repositories become larger and more complex an improved method is required to support not only extensive object modeling in such a repository, but associating classes between models.

SUMMARY OF THE INVENTION

It is an object of the present invention to provide navigation between objects in any direction by providing an API that allows objects, which are not members of the same tool/technology model, to be related.

Another object of the present invention is to provide a method that supports the dynamic addition of associations between objects in disparate models; where dynamic means no models containing associations between metadata are required, and no schema need be generated when such metadata is added to the repository.

A feature of the present invention is the ability to navigate multi-valued associations via collections of association objects or collections of the objects associated with a source object.

Another feature of the present invention is the ability to navigate from an object at one end of the association to an object at the other end of the association, or vice versa, or to navigate the association itself.

Yet another feature of the present invention is the ability to dynamically define destruct methods to be called when an association is destructed. These methods should operate in a fashion similar to the model supplied destruct methods for normal persistent objects and extend similar capabilities to associations.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

BRIEF DESCRIPTION OF THE DRAWINGS

FIGS. 5A and 5B combined form a flow chart illustrating the creation of a model object using the method of the present invention.

FIGS. 15A through 15H and 15J combined form a flow chart illustrating the process for checking generic preconditions (i.e., checkGenericPreconditions).

Figure 1:
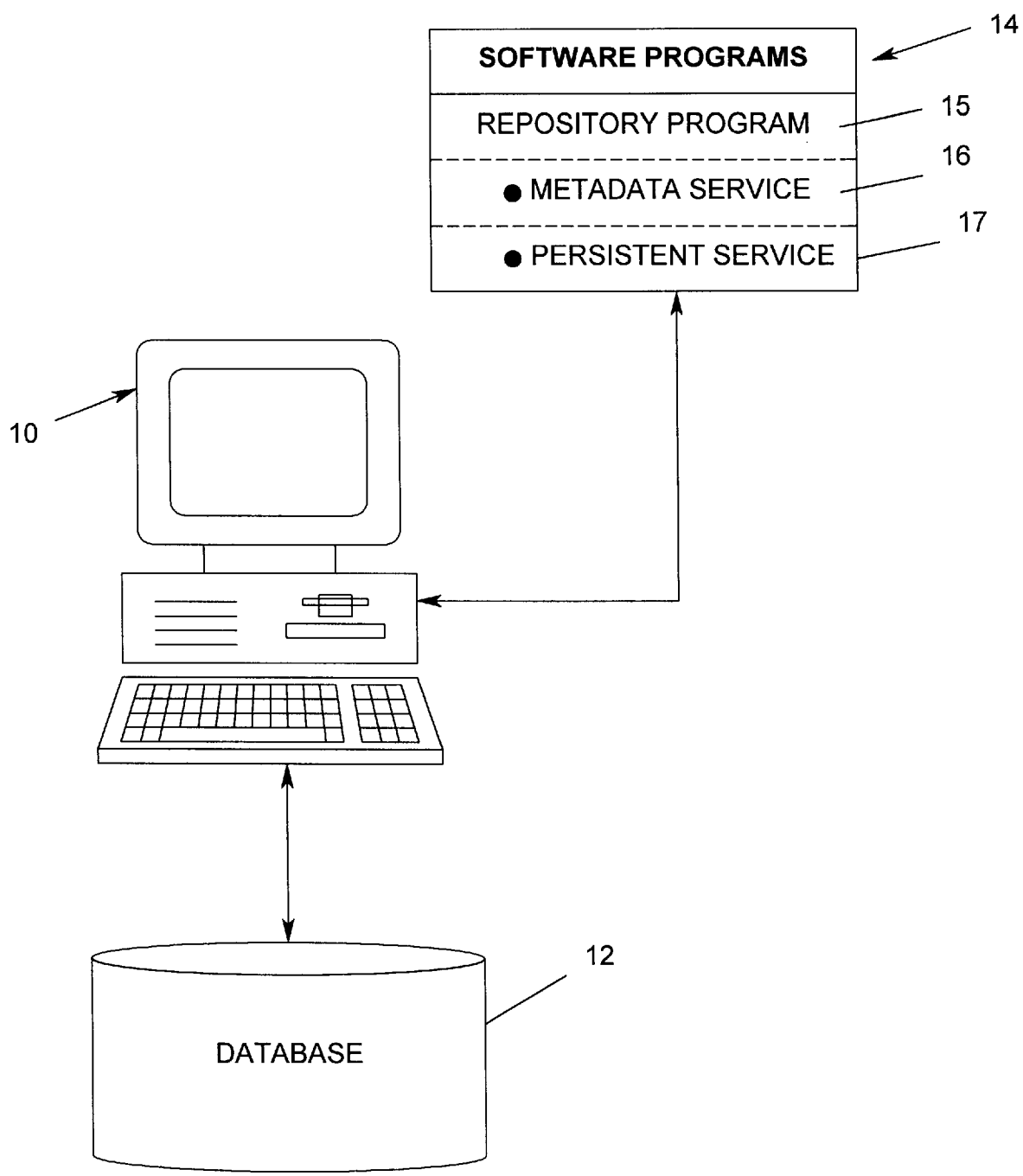
FIG. 1 is a block diagram of a computer system that may employ the present invention.

DETAILED DESCRIPTION OF ONE EMBODIMENT:

Before proceeding with a description of the system and method of the present invention, a summary of terminology used herein is provided, which may be helpful in understanding the disclosed embodiment.

An object is an abstract representation of a real-world concept or thing. For example, an object can be used to represent a customer account in a banking application. An object has features, which can be either an operation or a property. An operation defines an action that an object can perform, or an action that can be performed on the object. For example, "make withdrawal" could be defined as an operation on a customer account object. Properties indicate the state of an object. Every property of an object has a value, and it is the property values that define the state of the object. A property can be either an attribute or a reference. An attribute defines a value that is stored within the object. For example, "current account balance" could be an attribute of the customer account object. The numeric value for the customer's account balance would be stored in the customer account object. A reference is a link or pointer to another object, and implies a relationship to that other object. A reference is typically used when it is desired not to duplicate data. For example, the customer account object could store the customer's name and address as attributes. However, if the customer opened multiple accounts, the customer's name and address would appear in multiple account objects. Therefore, it is desirable to define a separate customer object and place the name and address as attributes of the customer object. The customer account object would then contain a reference to the customer object.

Types

A type is a template that describes a set of features—the state and behavior—that an object or another type can possess. A type defines a pattern that can be used to create or identify objects; it does not contain the actual object. A model is defined by a hierarchy of types.

Most types define the structure of repository objects as the features the objects can have. Data types define the values associated with the features. (Data types are also known as primitive types.) For example, data types are used to define attribute values, operation parameters, and operation return values. The values represented by the data types do not exist as separate objects in the repository. Instead, they are always stored as part of a repository object.

Persistent types define objects that continue to exist within the repository beyond the execution of a particular tool or of the repository. These persistent objects are essentially permanent—they remain in the repository until they are explicitly deleted by users. The majority of repository types are persistent.

A type that is derived from one or more other types is called a subtype. The definition of a subtype identifies the type or types from which it is derived. A type from which a subtype is derived is called the supertype. The definition of a supertype identifies the subtypes derived from it. A type cannot be a supertype or a subtype of itself. A subtype inherits all the features of its supertype. It can be customized by adding new features. The structure created by deriving types from other types is called a hierarchy. The hierarchy shows the relationship of the supertypes and subtypes. A hierarchy has a single base type. The base type is the highest supertype in the hierarchy.

In addition to features defined specifically for a subtype, each subtype acquires the features defined for the supertype. This trait is called inheritance. For example, managers have all of the features defined in Manager, and they inherit all of the features of Employee as well. Hence, if the Employee type has a feature such as name, we can ask for the name of a manager since Manager is a subtype of Employee.

A normal object program stores objects in a computer system's memory. When the program terminates, the memory used by those objects is freed and reused by other programs, making the objects that the program stored transient. An object database stores objects in a nonvolatile memory, such as a computer disk. Since the information on a computer disk remains in existence, even when the computer is turned off, an object database provides the ability to persistently store objects. An object program that uses an object database thus has the option of storing objects transiently or persistently.

Referring now to FIG. 1, a block diagram of a system that may employ the present invention is shown. A computer 10 is shown coupled to a storage device 12, which in the illustrated embodiment contains a database. The computer 10 is capable of executing a variety of software programs 14, including a repository program 15 including a metadata service and a persistent service.

The repository program 15 is a specialized, extensible object-oriented database application that adds value to a database system, which allows customization of a particular domain (such as application development) and it may be the same as the repository program 15 depicted in FIG. 1. The repository program 15 is capable of accessing the database in the storage device 12 for obtaining modeling data stored therein.

The repository program 15 further includes methods for cataloging, browsing, modeling, and managing components that make up an application. Methods to support these services are disclosed in several patents and patent applications assigned to the assignee of this patent application, including U.S. Pat. No. 5,671,398 for METHOD FOR COLLAPSING A VERSION TREE WHICH DEPICTS A HISTORY OF SYSTEM DATA AND PROCESSES FOR AN ENTERPRISE; U.S. Pat. No. 5,644,764 for METHOD FOR SUPPORTING OBJECT MODELING IN A REPOSITORY; U.S. Pat. No. 5,581,755 for METHOD FOR MAINTAINING A HISTORY OF SYSTEM DATA AND PROCESSES FOR AN ENTERPRISE; U.S. Pat. No. 5,557,793 for IN AN OBJECT ORIENTED REPOSITORY, A METHOD FOR TREATING A GROUP OF OBJECTS AS A SINGLE OBJECT DURING EXECUTION OF AN OPERATION; pending application Ser. No. 08/623,490, filed on Mar. 28, 1996, for A METHOD FOR MAPPING TYPES IN A MODEL IN A OBJECT-ORIENTED REPOSITORY TO LANGUAGE CONSTRUCTS FOR A C BINDING FOR THE REPOSITORY; U.S. Pat. No. 5,721,925, for METHOD FOR GENERICALLY INVOKING OPERATIONS IN AN OBJECT ORIENTED REPOSITORY; pending application Ser. No. 08/549,352, filed on Oct. 27, 1995, for A METHOD FOR GENERATING OLE AUTOMATION AND IDL INTERFACES FROM METADATA INFORMATION; U.S. Pat. No. 5,765,039 for A METHOD FOR PROVIDING OBJECT DATABASE INDEPENDENCE IN A PROGRAM WRITTEN USING THE C++ PROGRAMING LANGUAGE; U.S. Pat. No. 5,758,348, for A METHOD FOR GENERICALLY MANIPULATING PROPERTIES OF OBJECTS IN AN OBJECT ORIENTED REPOSITORY; U.S. Pat. No. 5,701,472, for A METHOD FOR LOCATING A VERSIONED OBJECT WITHIN A VERSION TREE DEPICTING A HISTORY OF SYSTEM DATA AND PROCESSES FOR AN ENTERPRISE; pending application Ser. No. 08/655,553, filed on May 30, 1996, for A METHOD FOR PACKING/UNPACKING C OPERATIONS TO/FROM RPC COMPATIBLE FORMAT USING THE RPC PROTOCOL TO OPERATE REMOTELY WITH AN OBJECT-ORIENTED REPOSITORY; pending application Ser. No. 08/934,833, filed on Sep. 22, 1997, for TOOL-INDEPENDENT APPLICATION DEVELOPMENT; and, pending application Ser. No. 08/934,834, filed on Sep. 22, 1997, for EXCHANGING INFORMATION BETWEEN DIFFERENT OBJECT MODELS AND UML; each of which are hereby incorporated by reference as if set forth in full herein.

The method of the present invention, which is an improvement to the repository program 15, provides a mechanism for representing a concept that is too large or complex to describe as a single entity. This mechanism includes modeling, which represents the concept as a set of components and the relationships between these components. Models are abstractions of real-world concepts such as ideas, objects or systems. Typically, models are used to describe, design and document systems such as a reservation system for an airline, a banking system or a patient-information system for a hospital. Information models represent the information processed or managed by enterprises. An information model represents an enterprise as a set of related components, called types, and the relationships among the types. The types provide templates defining the structure of the information and the services provided by the model. The information model of the present invention defines information that can be stored in the repository. It also identifies the services provided by the repository and the tool and technology models supported thereby.

Figure 2:
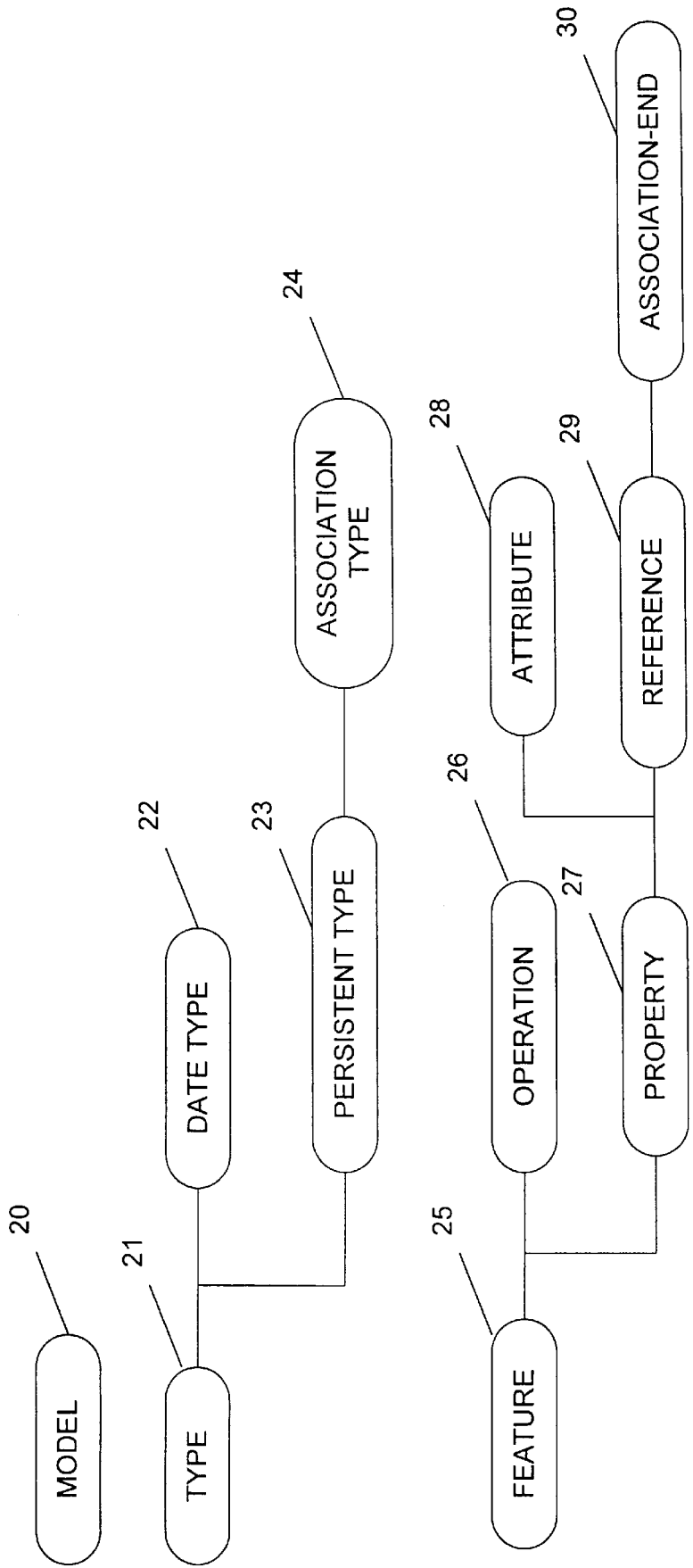
FIG. 2 is an organization chart amplifying the breakdown of elements of a model into types and features, and their constituents.

Specification of a model in the repository depends on the definition of the object types of the metadata. With reference to FIG. 2, object types of the metadata service are shown. First, there is a model 20 followed by a type 21. A type is a template that describes a set of features (the state and behavior) that an object or another type can possess. A type defines a pattern that can be used to create or identify objects; it does not contain the actual object. A model is defined by a hierarchy of transient data types 22 or persistent object types 23. An association type 24 is a type defining the relationship between two or more persistent types. Next, there are features 25, which are categorized into operations 26, or properties 27. A feature defines some element of either the state or the behavior that objects can possess. A feature is defined for a type, but applied to the corresponding objects. In other words, a type defines the layout of the data for the objects, and objects are instances of the type. Properties define a state. For example, a salary feature is a property that defines an employee's current salary. Operations define behavior. For example, the setSalary feature is an operation that defines the mechanism for changing an employee's salary. The properties 27 are categorized as attributes 28, whose values are embedded within the owning objects, and references 29, whose values are independent objects.

An association-end 30 is a special kind of reference (shown depending from the reference 29) in that its value is one or more independent objects. It differs from a reference in that it is part of the association type rather than part of one of the persistent types being related. Changing a reference value changes the owning object. Changing an association-end value changes the association object but none of the objects that currently are (or were) related to each other via the association object.

Figure 3:
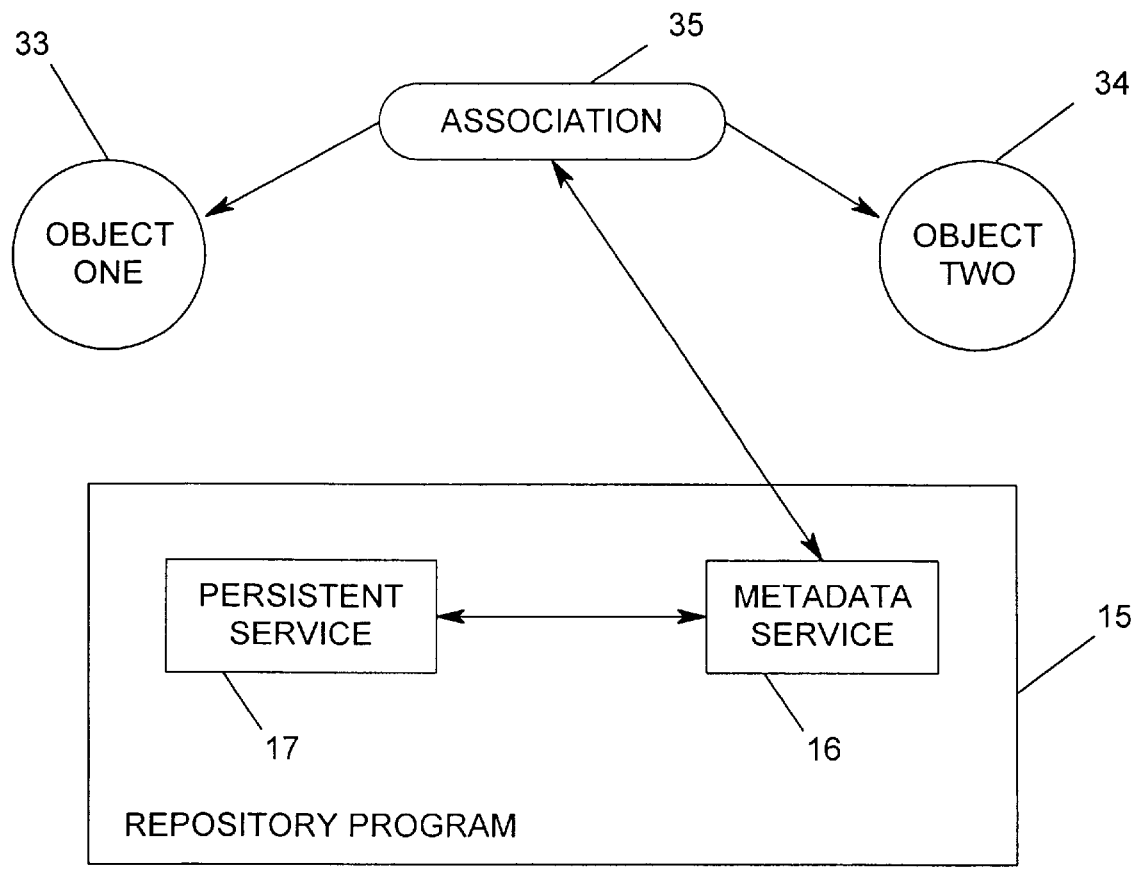
FIG. 3 is a chart illustrating the concept of association.

Referring now to FIG. 3, a chart illustrating the concept of association is shown. The repository program 15 is depicted as having a metadata service 16 and a persistent service 17. It is noted that the repository 15 contains many more services than what is illustrated herein. Refer to the above-cited patents and patent applications for a greater amplification of an exemplary repository, such as the program 14. Object One 33 and Object Two 34 are associated with one another by an association object 35. The term association, as used herein, means an object whose sole purpose is to describe the relationships between other objects. Such objects may or may not have their own properties or operations. If they do, they store information about the relationship between objects and not the objects themselves. Moreover, association object operations act upon the relationship or its state values and not on the state of the related objects.

Figure 4:
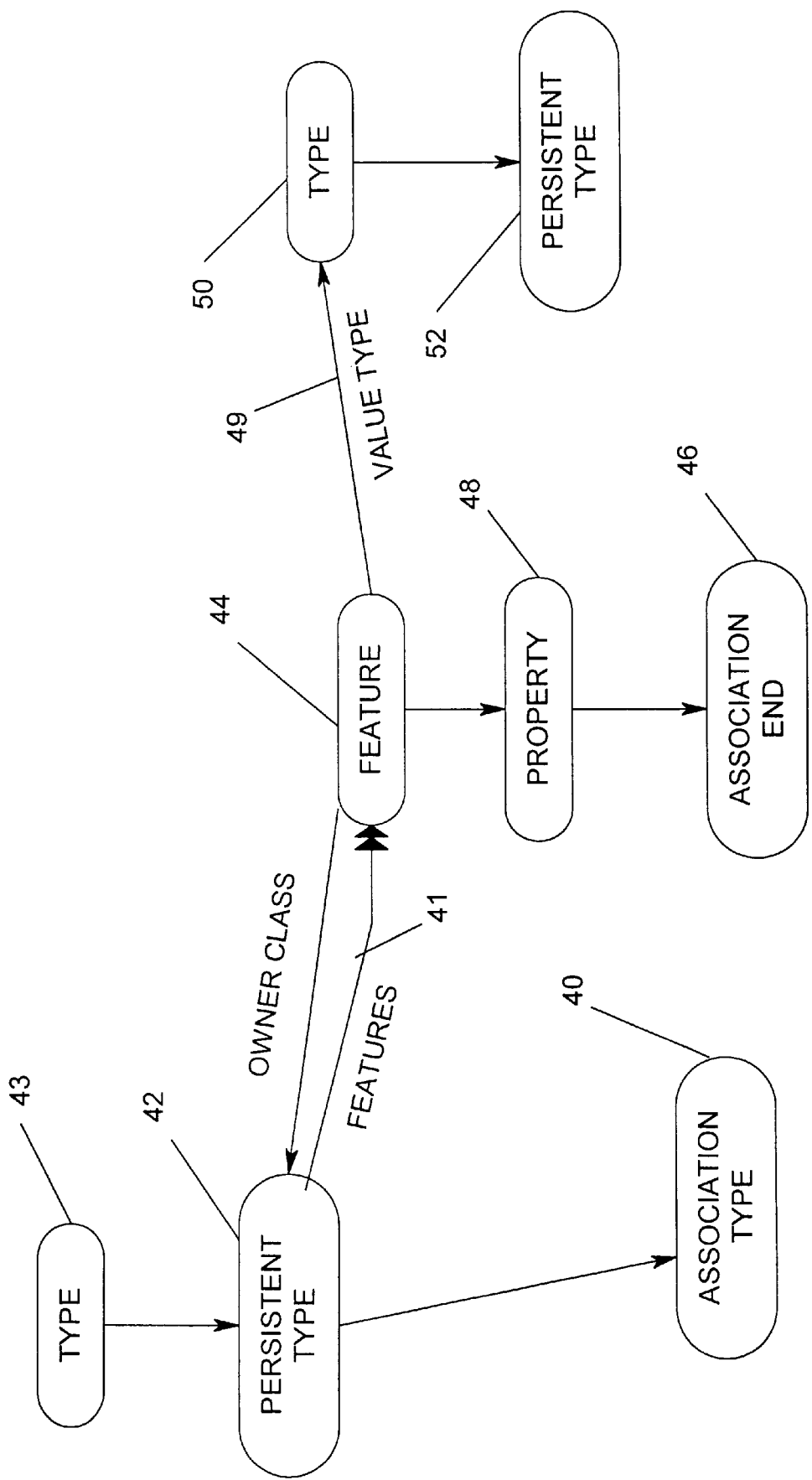
FIG. 4 is a chart showing hierarchy of the types and how an association type relates to association ends and their value types.

Referring now to FIG. 4, a chart illustrates both the hierarchy of types involved in defining an association type between two persistent types and the properties used in defining the whole association type. All vertical relationships shown in the figure (when viewed in the conventional manner) are subtype/supertype relationships. All horizontal relationships shown in the figure are the relationship of leaf types in each vertical type hierarchy.

An association type 40 is a subtype of a persistent type 42, which is a subtype of a type 43. The association type 40 inherits the features property from its supertype (i.e., persistent type 42). The features of a persistent type (in general) are its properties and operations. The inverse of the features property is the owner class property of a feature 44. This property indicates which persistent type or association type owns a particular feature.

An association end 46 is itself a subtype of a property 48, which is a subtype of a feature 44. One of the properties of the feature 44 that the association end 46 inherits is valuetype property 49. For an association end the valuetype property indicates the persistent type which an association end relates to another persistent type. It should be noted that there are two or more association ends 46 of a single association type 40, even though only one association end 46 is shown in the figure. The reason for this is quite simple. There must be a beginning and an end to an association (e.g., a record, model, part of a model, etc). Hence, one association-end marks the beginning and the second association-end marks the end of the association. An association type with both of the association ends relating the same persistent type to itself is referred to as a reflexive association. That is, the underlying association object defined by the association type 40 relates instances defined by the persistent type 52 to other instances of the same persistent type.

Therefore, the association type 40 has features 41 (which are multi-valued, as denoted by the double-headed arrow) just like any other persistent type. However, at least two of those features must be association ends 46. The association type 40 may also contain other types of properties and operations. Furthermore, an association type may contain more than two association ends. However, it must contain at least two association ends, as stated above. Each association end 46 has a value type which is a persistent type 52 being related by the combination of the association type 40/association ends 46. The two association ends of an association therefore relate two persistent types to each other via the composite association type. That is, each association type contains two association ends and each end points at a persistent type via a value type 49.

Figure 5B:
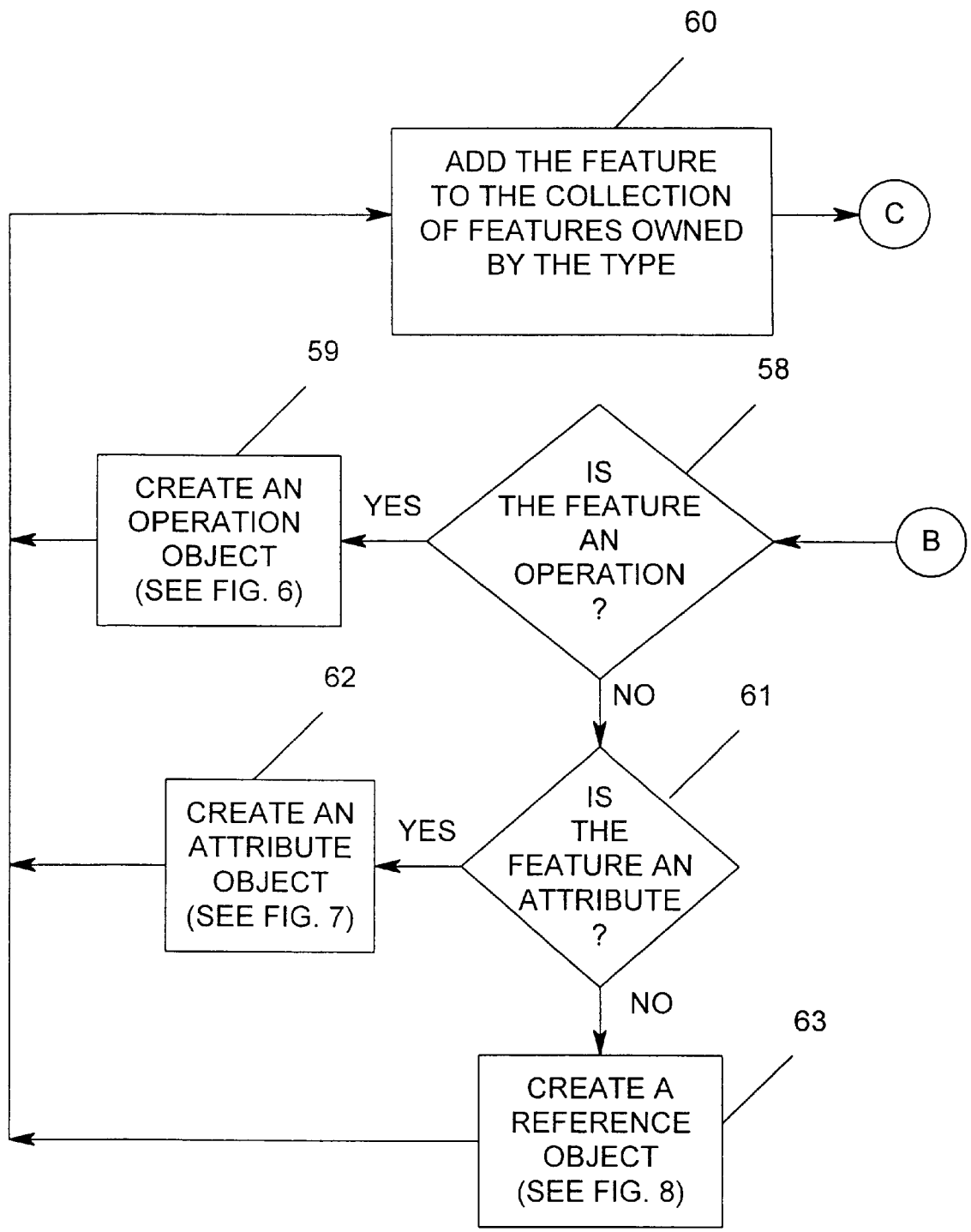

Referring now to FIGS. 5A and 5B, a flow chart of the process for the creation of a model object using the method of the present invention is shown. A bubble 55, which depicts initializing of the persistent type object, begins the process. A persistent type consists of a collection of features. A feature object must be created for each feature of the persistent type, such as an operation, an attribute or a reference. An inquiry is next made as to whether or not this persistent object is also an association type (decision diamond 56). If the answer to this inquiry is no, then another inquiry (decision diamond 56) is made as to whether or not there are more features of type to create. If the answer to this inquiry is yes, then a branch is taken to a continuation of the process illustration in FIG. 5B as depicted by a connector B.

Referring briefly back to FIG. 2, note that a feature is either an operation or a property. Also, note that a property 27 is either an attribute 28 or a reference 29. Referring now to FIG. 5B, at the connector B, an inquiry is made as to whether or not the feature is an operation (diamond 58). If the feature is an operation, then an operation object is created (block 59). After this, the feature is added to the collection of features owned by the type (block 60) and a return is made back to the diamond 57 (FIG. 5A) for the next feature, as denoted by a connector C. The operation object creation process will be explained in greater detail hereinbelow in conjunction with the description of FIG. 6.

Figure 7:
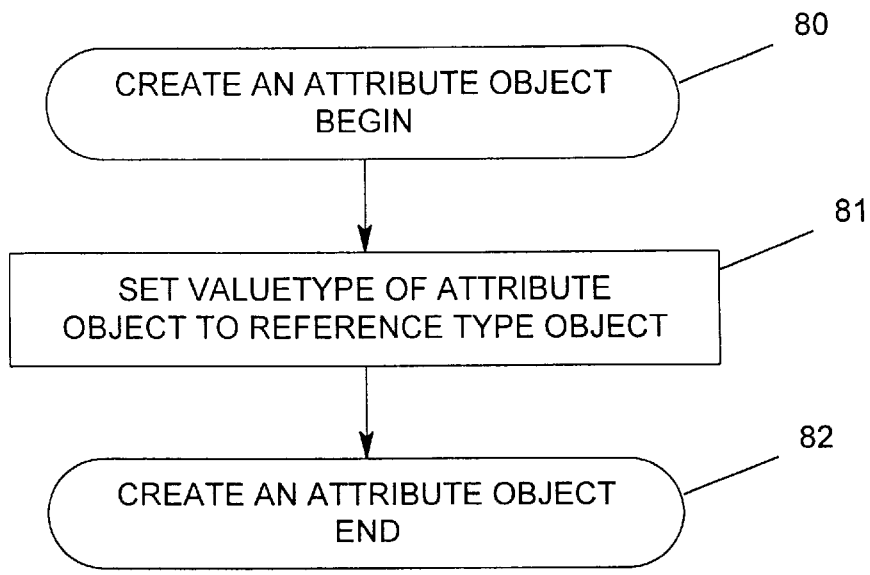
FIG. 7 is a flow chart showing how to create an attribute object.
Figure 8:
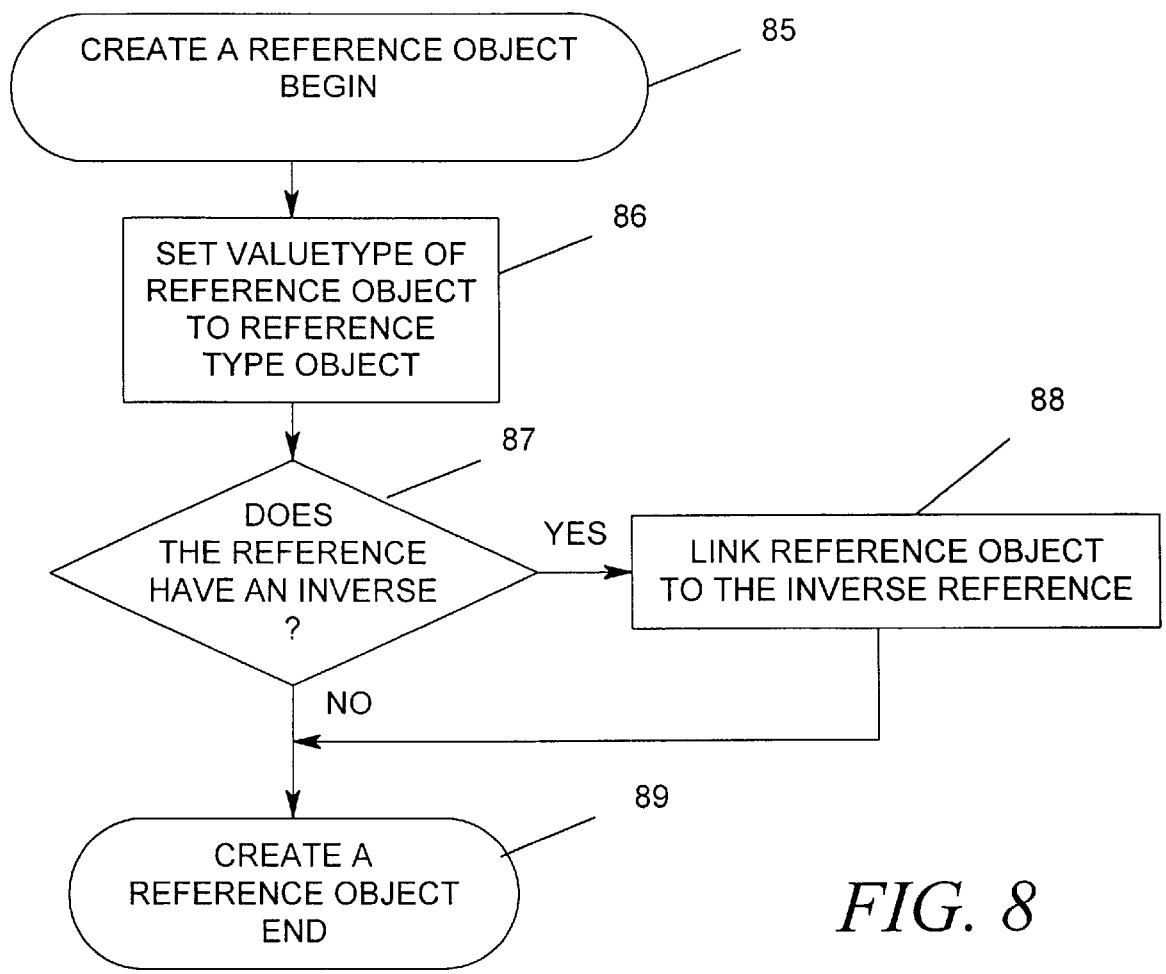
FIG. 8 is a flow chart showing how to create a reference object.

If the feature is not an operation, then another inquiry is made as to whether or not the feature is an attribute (diamond 61). If the answer to this inquiry is yes, then an attribute object is created (block 62) and it is added to the collection of features owned by the type (block 60). The process for the creation of an attribute object is illustrated in FIG. 7 and further amplified hereinbelow. If the feature being queried is not an attribute, then a reference object is created (block 63) and the feature is added to the collection of features owned by the type (block 60). The process for the creation of a reference object is illustrated in FIG. 8 and further amplified hereinbelow.

Figure 9:
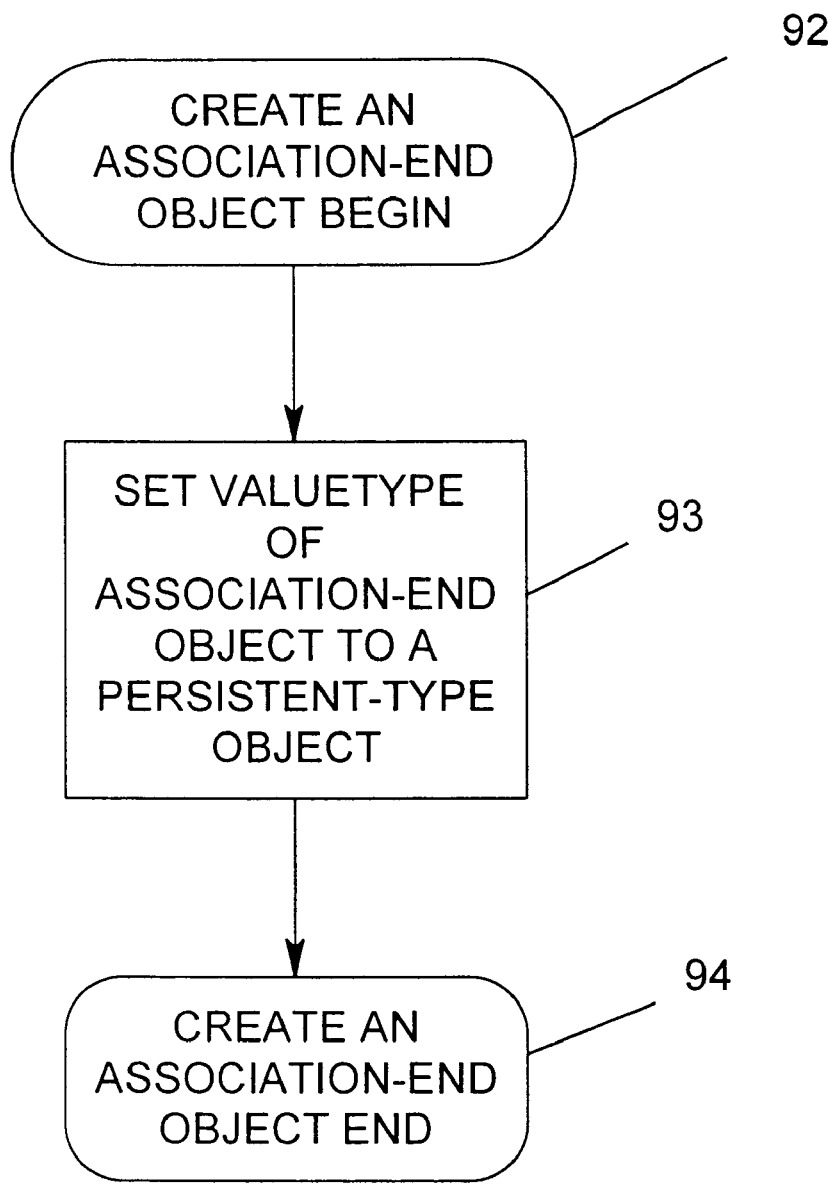
FIG. 9 is a flow chart showing how to create an association-end object.

Referring back to FIG. 5A at the diamond 56, if the type is an association type, then yet another inquiry is made as to whether or not there are more association ends to create (diamond 64). If the answer to this inquiry is yes, then an association-end object is created (block 65). The process for the creation of an association-end object is illustrated in FIG. 9 and further amplified hereinbelow. After the association-end object has been created, then it is added to the collection of features owned by the type (block 66) and a return is made back to the diamond 64 for processing other association-ends. Once all association-ends have been created (no exit from the diamond 64) then a return is made back to the diamond 57 for processing the next feature of type to create. If there are no more features of type to create, then the persistent type object is initialized (bubble 67).

Figure 6:
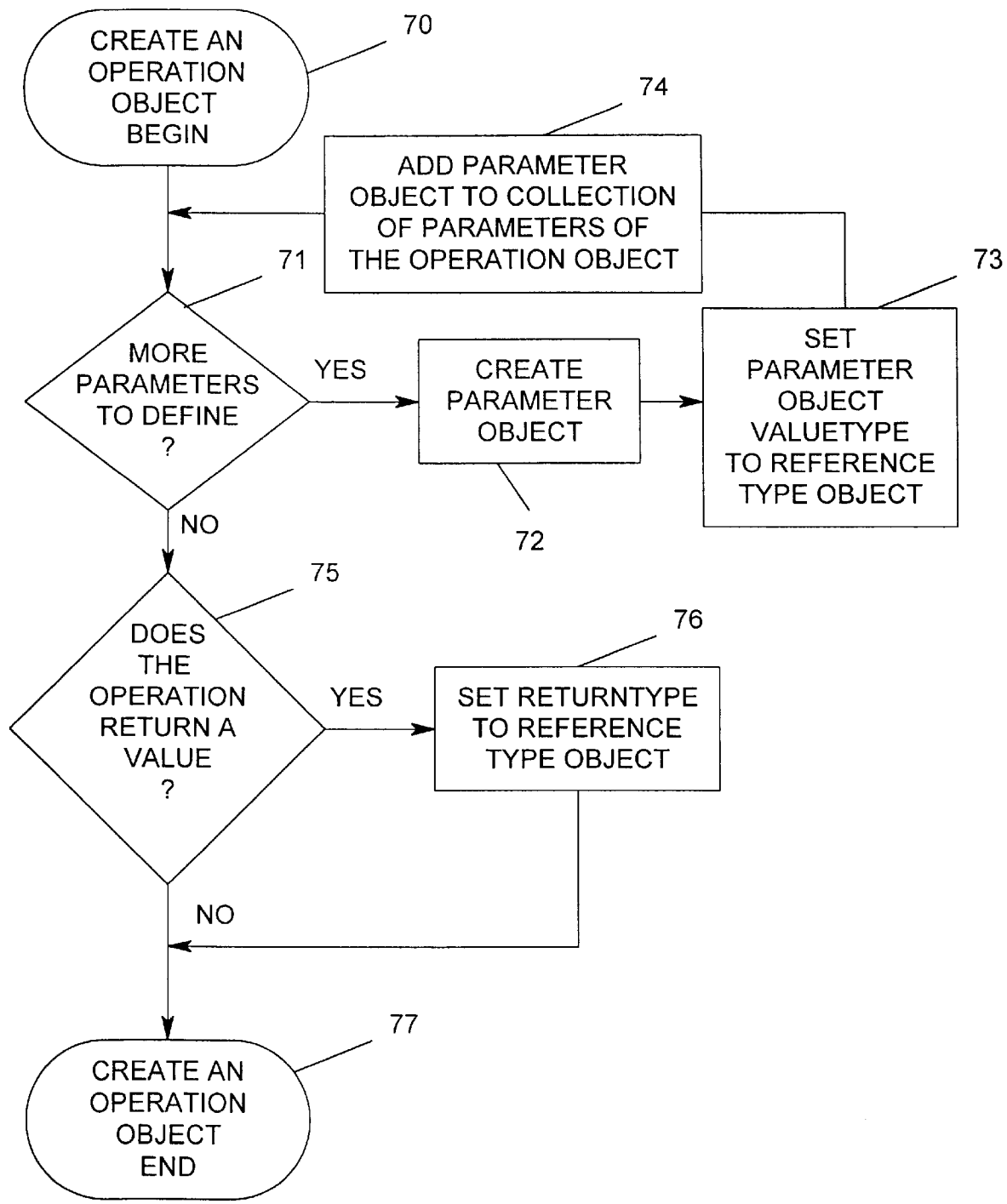
FIG. 6 is a flow chart showing how to create an operation object.

Referring now to FIG. 6, a flow chart amplifying the create an operation object (block 59, FIG. 5B) is illustrated. The creation of an operation object process starts with a BEGIN bubble 70. Recall that an operation comprises a collection of parameters, and the text files include all the necessary parameters. Thus, a parameter object must be created in the repository for each parameter defined for the operation. The first inquiry is whether or not there are more parameters to define, as depicted by a decision diamond 71. If the answer to this inquiry is yes, then a parameter object is created to represent the parameter of the operation (process block 72). A parameter object comprises a link to the type object that represents its value type. Hence, the parameter object is linked to the corresponding type object (process block 73). Next, the parameter object is added to a collection of parameters for the operation object (process block 74). Following this operation a return is made to the entry of the decision diamond 71 for retrieval of the next parameter, if any.

Once there are no more parameters to define, as depicted by the no branch from the diamond 71, then an inquiry is made as to whether or not the operation returns a value as depicted by a decision diamond 75. Note that an operation also consists of an optional link to the type object that represents its return value type. If the operation returns a value (as depicted by the yes branch from the diamond 75), then the return type is set to a reference type object, which is depicted by a process block 76. Following this process step, or if the operation does not return a value, an exit is taken from this routine as depicted by a bubble 77.

Referring now to FIG. 7, a flow chart amplifying the create an attribute (block 62, FIG. 5B) is illustrated. The process for creating an attribute object starts with a BEGIN bubble 80. Note that an attribute object consists of a link to the data type object that represents its value type. Thus, the attribute object is linked to the corresponding data type object. This process step is depicted by a process block 81, which sets the value Type of attribute to reference type object. Following this step an exit is taken from this routine as depicted by a bubble 82.

Referring now to FIG. 8, a flow chart amplifying the create a reference (block 63, FIG. 5B) is illustrated. The process for creating a reference object starts with a BEGIN bubble 85. Note that a reference object consists of a link to the persistent type object that represents its value type. Thus, the reference object is linked to the corresponding persistent type object. This process step is depicted by a process block 86, which sets the value Type of reference object to reference type object. A reference is a link from one persistent type to another persistent type. A reference can have an inverse, which is a reference from that other type back to the original type. A reference and its inverse are maintained automatically by the repository in order to maintain reference integrity. Therefore, an inquiry is next made as to whether or not the reference has an inverse, which is depicted by a decision diamond 87. If the answer is yes, then the reference object is linked to the inverse reference (process block 88). Following this step, or if the reference does not have an inverse, an exit is taken from this routine as depicted by a bubble 89.

Referring now to FIG. 9, the create an association-end object (block 65, FIG. 5A) is shown. The process begins with a bubble 92, followed by a process step of setting the valuetype of an association-end object to a persistent-type object (block 93). Note that an association-end comprises a link to the persistent type object that represents its value type. Thus, the association-end object is linked to the corresponding persistent type object, which process step is depicted by the block 93. The process then ends, bubble 94.

Figure 10:
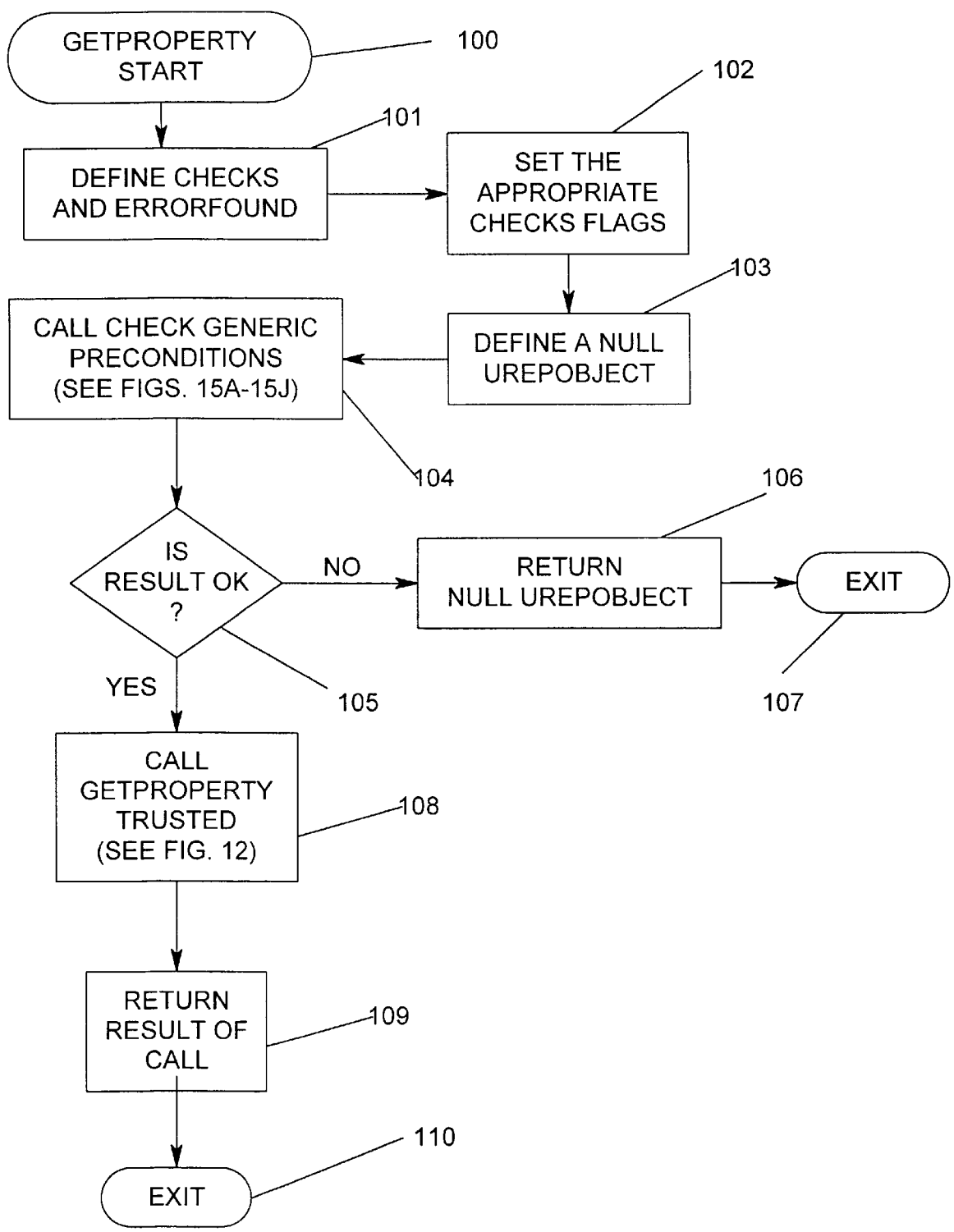
FIG. 10 is a flow chart illustrating the steps of the process for getting a property (i.e., getProperty).

Referring now to FIG. 10, a flow chart is shown of the process for getting a property, which is also referred to herein as getProperty. The process begins with a start bubble 100 followed by a step of defining an error flag and a checks integer (block 101). Next a step of setting the checks value for the operation is performed (block 102), followed by a step of defining a null UrepObject (block 103). Another process sequence called checkGenericPreconditions, set forth in FIGS. 15A–15J and described further hereinafter, is called to validate the input (block 104). An inquiry is next made to determine if the result is OK, decision diamond 105. If the validation is not satisfactory, the null UrepObject is returned (block 106), and the process is exited (bubble 107). On the other hand if the validation is satisfactory, then another process sequence getPropertyTrusted (set forth in FIG. 12 and described further hereinafter) is called to retrieve the property value (block 108). The results of this call is returned (block 109) and the process is exited (bubble 110).

Figure 11:
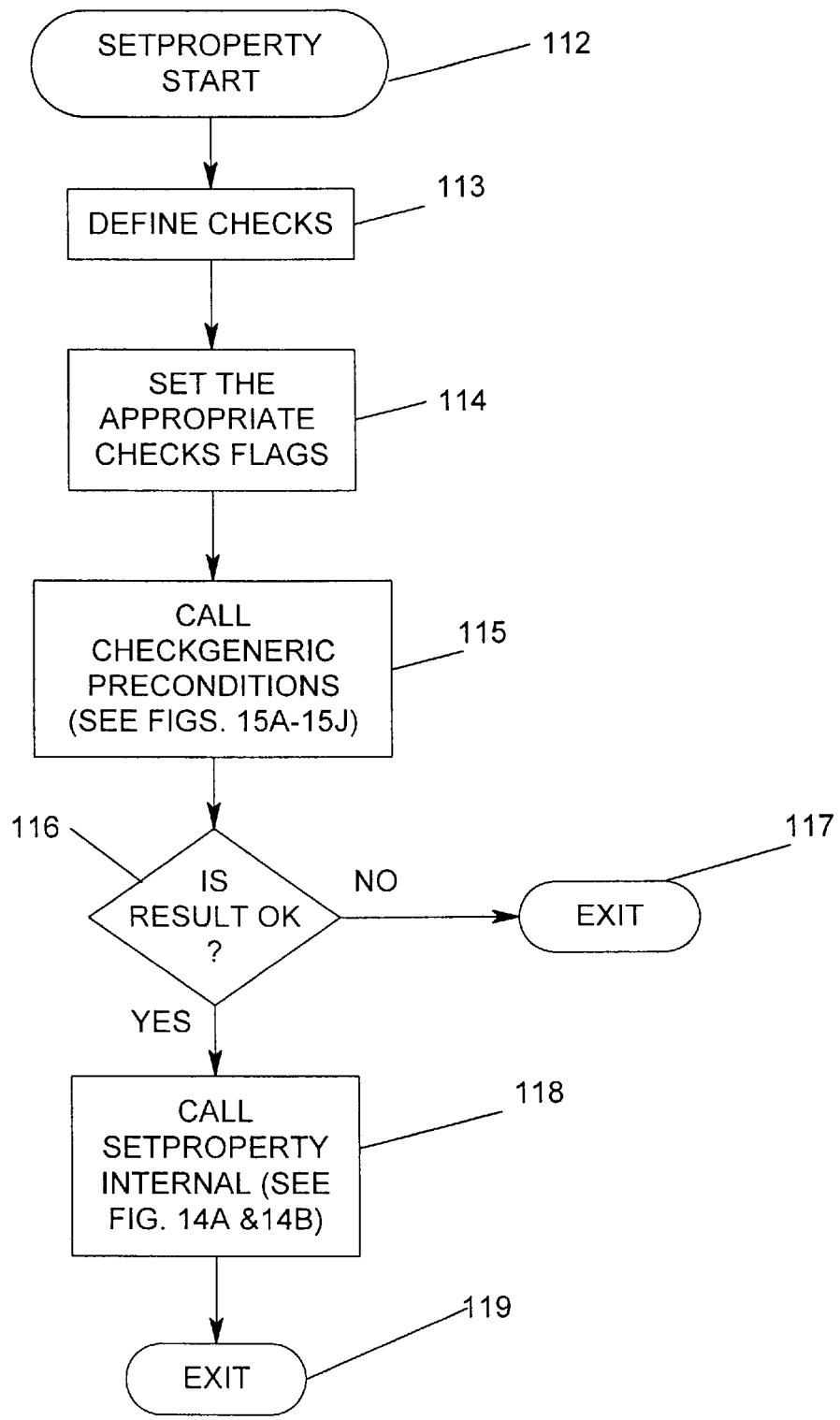
FIG. 11 is a flow chart illustrating the steps of the process for setting a property (i.e., setProperty)

Referring now to FIG. 11, a flow chart illustrates the process for setting a property. The process begins with a start bubble 112, followed by a step of defining a checks integer (block 113). Next, the appropriate flags are set (block 114), which sets the checks value for the operation. The checkGenericPreconditions process sequence (set forth in FIGS. 15A–15J and described further hereinafter) is called to validate the input (block 115). An inquiry is made to determine if the result is OK (decision diamond 116). If the validation is not satisfactory, the process is exited (bubble 117). On the other hand if the validation is satisfactory a process sequence setPropertyInternal, which is set forth in FIGS. 14A and 14B and is to be described further hereinafter, is called to set the property value (block 118). After this step the process is exited (bubble 119).

Figures 12, 13:
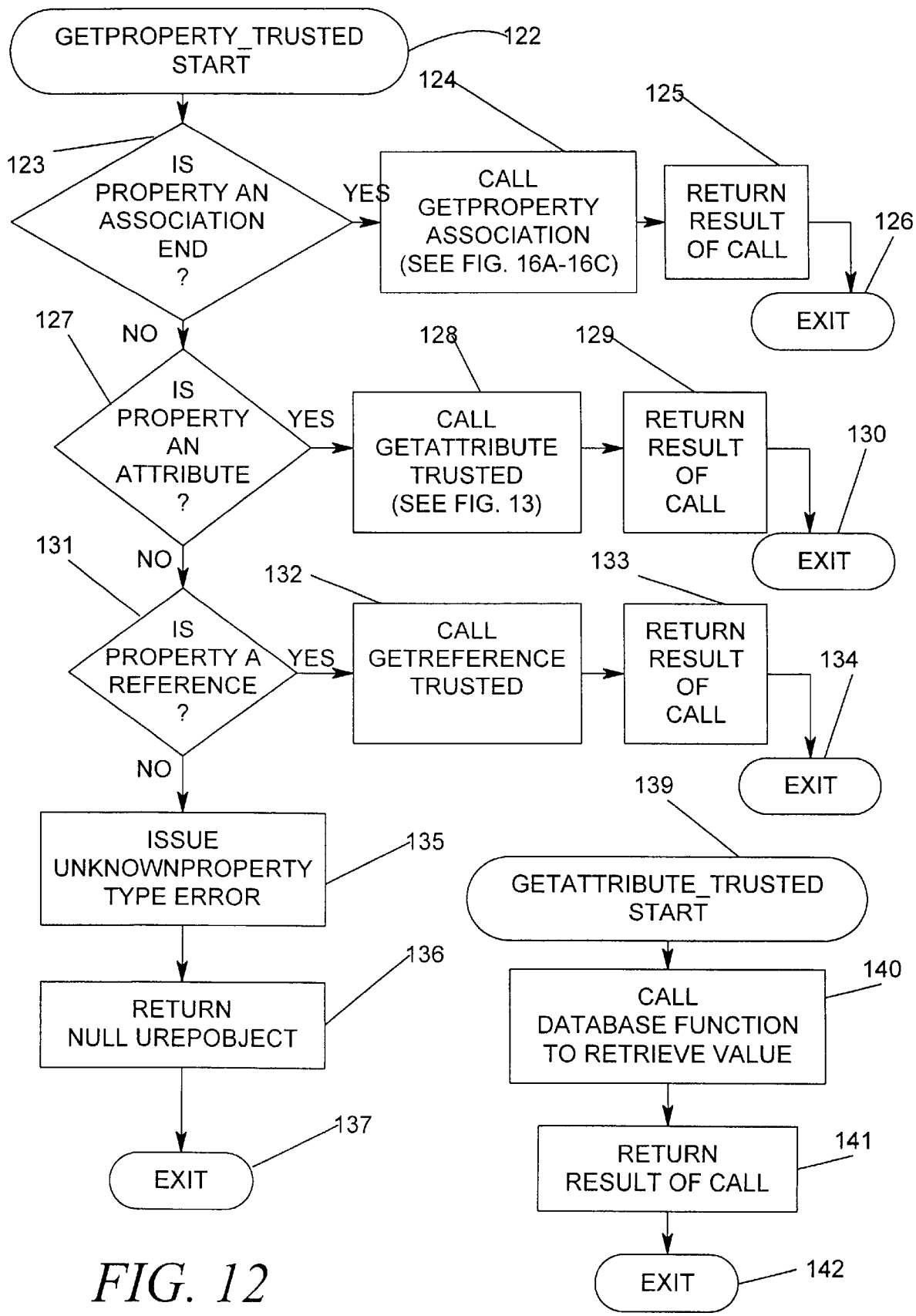
FIG. 12 is a flow chart illustrating the steps of the process for getting a property in a trusted manner (i.e., getPropertyTrusted).
FIG. 13 is a flow chart illustrating the steps of the process for getting an attribute in a trusted manner (i.e., getAttributeTrusted).

Referring now to FIG. 12, a flow chart illustrates the getProperty_Trusted process sequence. The process begins with a start bubble 122, followed by an inquiry to determine if the property is an association end (diamond 123). If the answer to this inquiry is yes, then get_property_association is called (block 124), which process is amplified hereinafter and illustrated in FIGS. 16A and 16B. The result of this call is returned (block 125) and the process is exited (bubble 126). If the property is not an association (no exit from the diamond 123), then an inquiry is made as to whether or not the property is an attribute (decision diamond 127). If the property is an attribute, then a process sequence getAttribute_Trusted (set forth in FIG. 13 and described further hereafter) is called to retrieve the property value (block 128). The result of calling this process sequence is returned (block 129), and this process is exited (bubble 130). Returning to the decision diamond 127, if the property is not an attribute, then another inquiry is made as to whether or not the property is a reference (diamond 131). If the property is a reference, then a getReference_Trusted process sequence is called (block 132), which process is illustrated in FIG. 7 of the above-referenced patent number 5,758,348 and amplified therein. The result of calling this process sequence is returned (block 133) and the process is exited (bubble 134).

Returning to the decision diamond 131, if the property is not a reference, then an unknown property type error is issued (block 135). Next, a null UrepObject is returned (block 136), and process is exited (bubble 137).

Referring now to FIG. 13, a flow chart illustrates the getAttribute_Trusted process sequence. After entering the process (bubble 139), the database interface function is called to retrieve the value of the attribute (block 140). Next, the result of the call is returned (block 141) and the process sequence is exited (bubble 142).

Figure 14A:
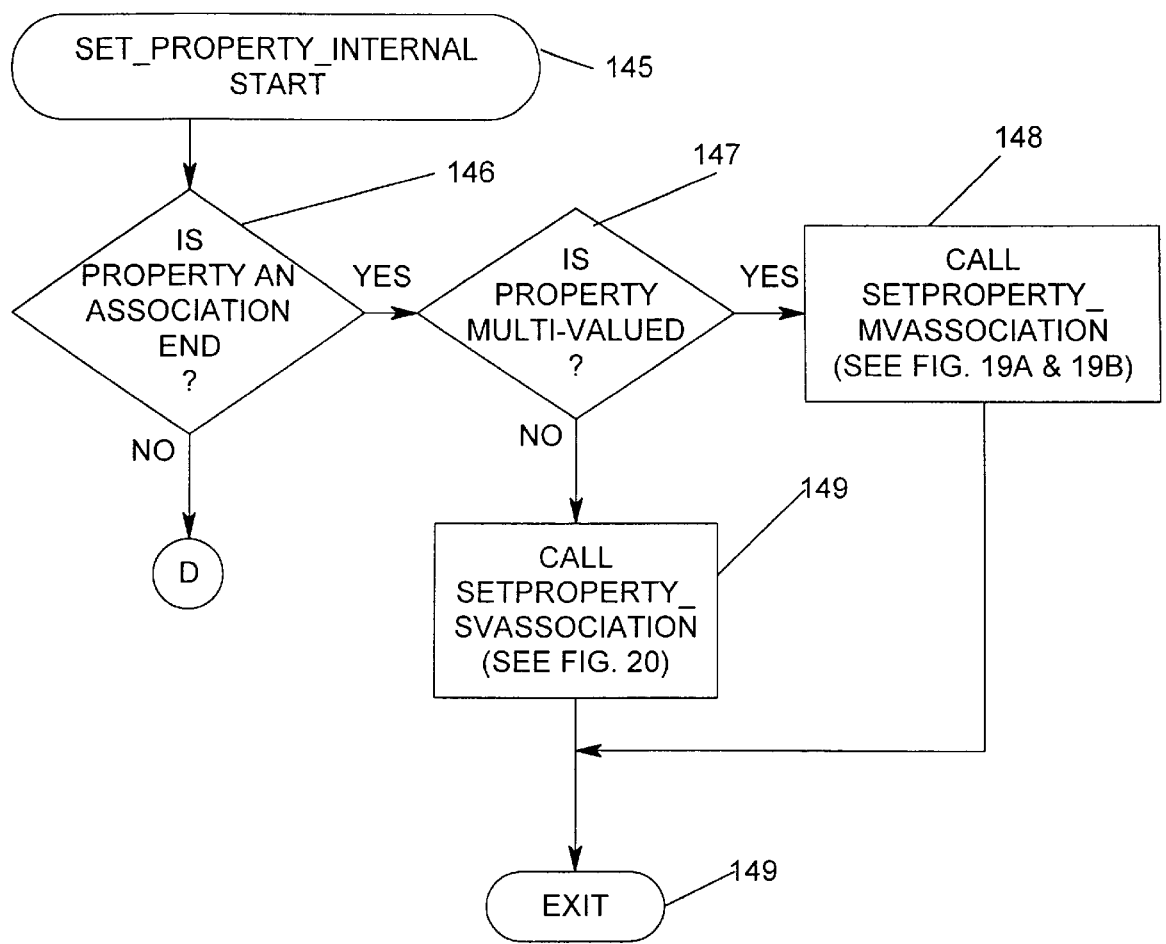
FIGS. 14A and 14B combined form a flow chart illustrating the steps of the process for setting a property internally (i.e., setPropertyInternal).

Referring now to FIG. 14A, the process for setting property internal (i.e., Set_Property_Internal) is shown. The process begins with a start bubble 145 followed by an inquiry as to whether or not the property is an association end (diamond 146). If the answer to this inquiry is yes, then another inquiry is made as to whether or not the property is multi-valued (diamond 147). If the answer to this inquiry is yes then a call is made for the Set_Property_MVAssociation process (block 148), which is amplified hereinafter and illustrated in FIGS. 19A and 19B. On the other hand, if the answer to this inquiry is no, then the Set_Property_SVAssociation process (block 149) is called, which is amplified hereinafter and illustrated in FIG. 20. After this, the process is exited, bubble 149. Referring back to the diamond 146, if the property is not an association end, then the process illustration continues in FIG. 14B as denoted by a connector D.

Figure 14B:
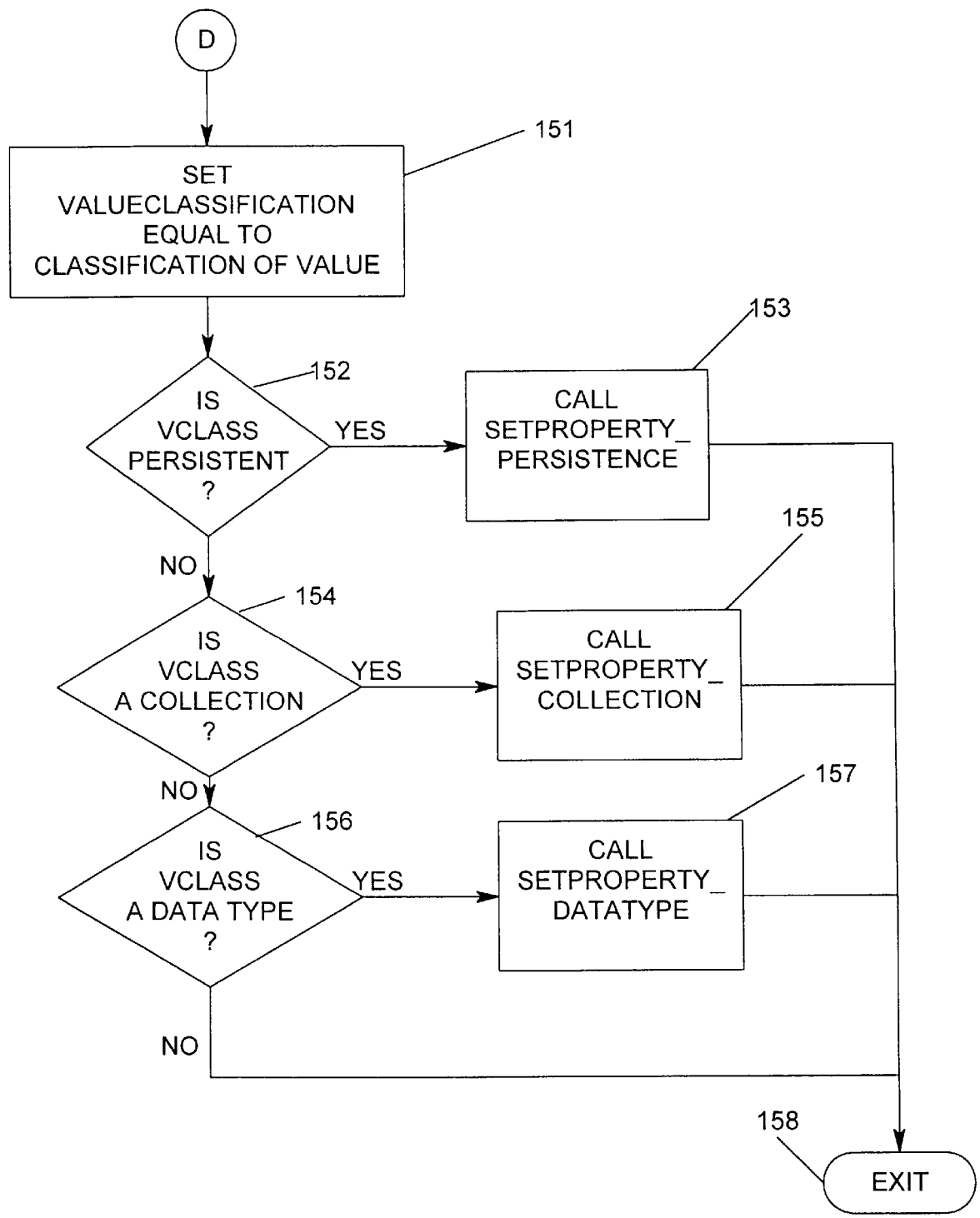

Referring now to FIG. 14B at the connector D, the local variable Value_Classification is set equal to the classification of value (block 151). Next, an inquiry is made as to whether or not Value_Classification is persistent (diamond 152). If the answer to this inquiry is yes, then the process for Set_Property_Persistence is called (block 153). On the other hand, if Value_Classification is not persistent then another inquiry is made as to whether or not Value_Classification is a collection (diamond 154). If the answer to this inquiry is yes, then the process for Set_Property_Collection is called (block 155). On the other hand, if Value_Classification is not a collection, then yet another inquiry is made as to whether or not Value_Classification is a data type (diamond 156). If the answer to this inquiry is yes, then the process for Set_Property_Datatype is called (block 157). If Value_Classification is not a data type, or upon completion of the steps depicted by the blocks 153, 155 or 157 the process is exited (bubble 158).

Details of the setProperty_Persistence process (block 153_) are illustrated in FIGS. 9A through 9D of the above-cited patent number 5,758,348; details of the setProperty_Collection process (block 155) are illustrated in FIGS. 11A through 11F of this same patent; and, details of the setProperty_DataType are illustrated in FIGS. 10A and 10B of this same patent.

Figure 15A:
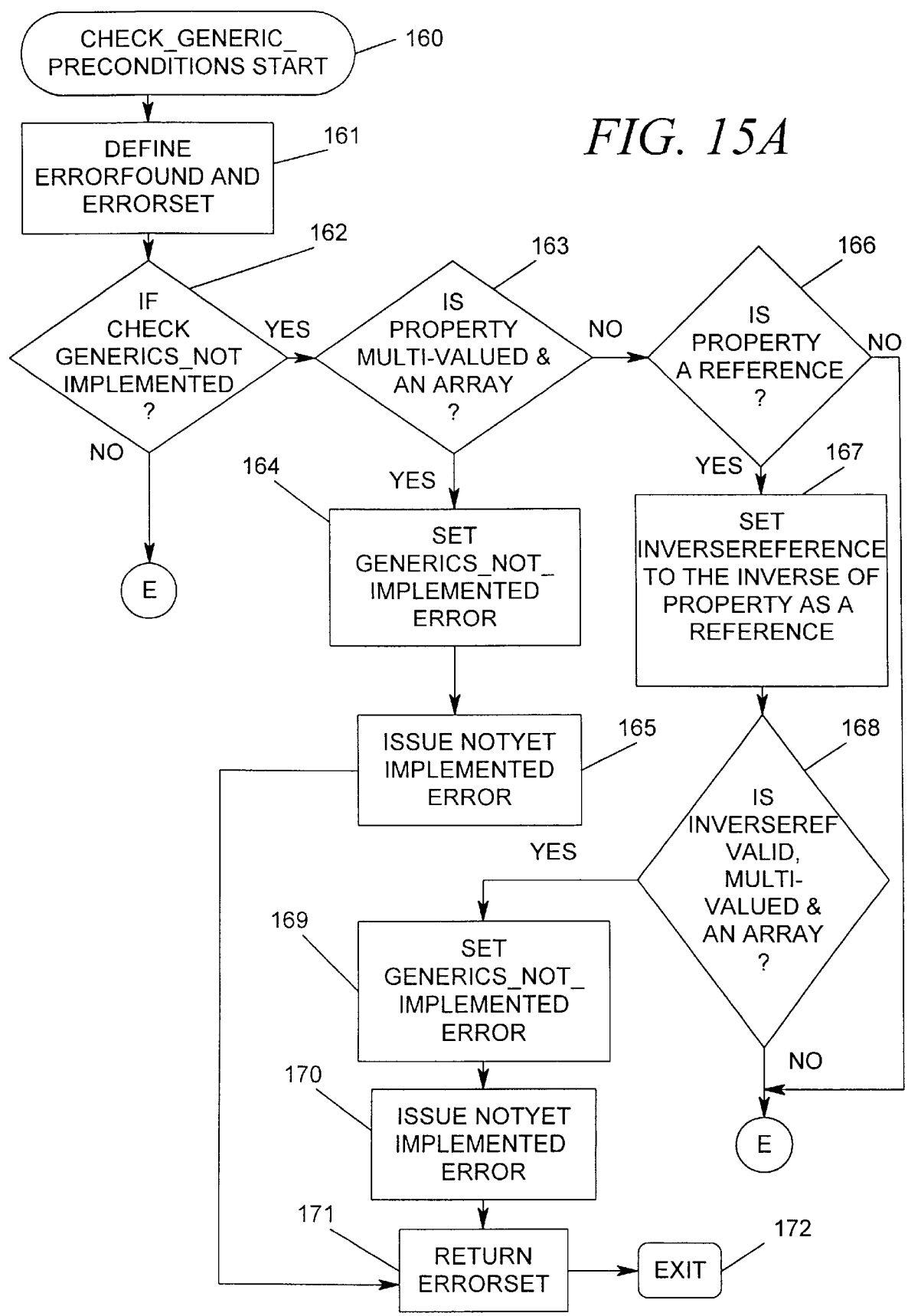

Referring now to FIG. 15A. the beginning of a nine-sheet flow chart illustrates the checkGenericPreconditions process. The process begins with a start bubble 160, followed by a process step defining an errorFound flag and an errorSet integer (block 161). Next an inquiry is made as to whether or not checking condition CHECK_GENERICS_NOT_IMPLEMENTED (diamond 162). If the answer to this inquiry is yes, then another inquiry is made as to whether or not property is multi-valued and the collection type of property is array (diamond 163). If the answer to this inquiry is yes, then a process step of setting GENERICS_NOT_IMPLEMENTED error flag is performed (block 164). Next, a notYetImplemented error is issued (block 165).

On the other hand, if the answer to the inquiry at diamond 163 is no, then yet another inquiry is made as to whether or not property is a reference (diamond 166). If the answer to this inquiry is yes, then a process step of setting inverseReference to the meta reference which is the inverse of reference is performed (block 167). After this another inquiry is made as to whether inverseReference is invalid, it is multi-valued and the collection type of inverseReference is an array (diamond 168). If the answer to this inquiry is yes, then a GENERICS_NOT_IMPLEMENTED error flag is set (block 169). Next, a notYetImplemented error is issued (block 170), followed by a process step of returning the value of errorSet (block 171). Note that upon completion of the process step of block 165 entry is made to the process block 171. After this, the process is exited (bubble 172).

Returning to the decision diamond 162, if the answer to this inquiry is no then a branch is taken to the next sheet of the flow chart as denoted by a connector E. In a similar manner, the no exits of both the decision diamonds 166 and 168 lead to a branch to the next sheet of the drawings as denoted by the connector E.

Figure 15B:
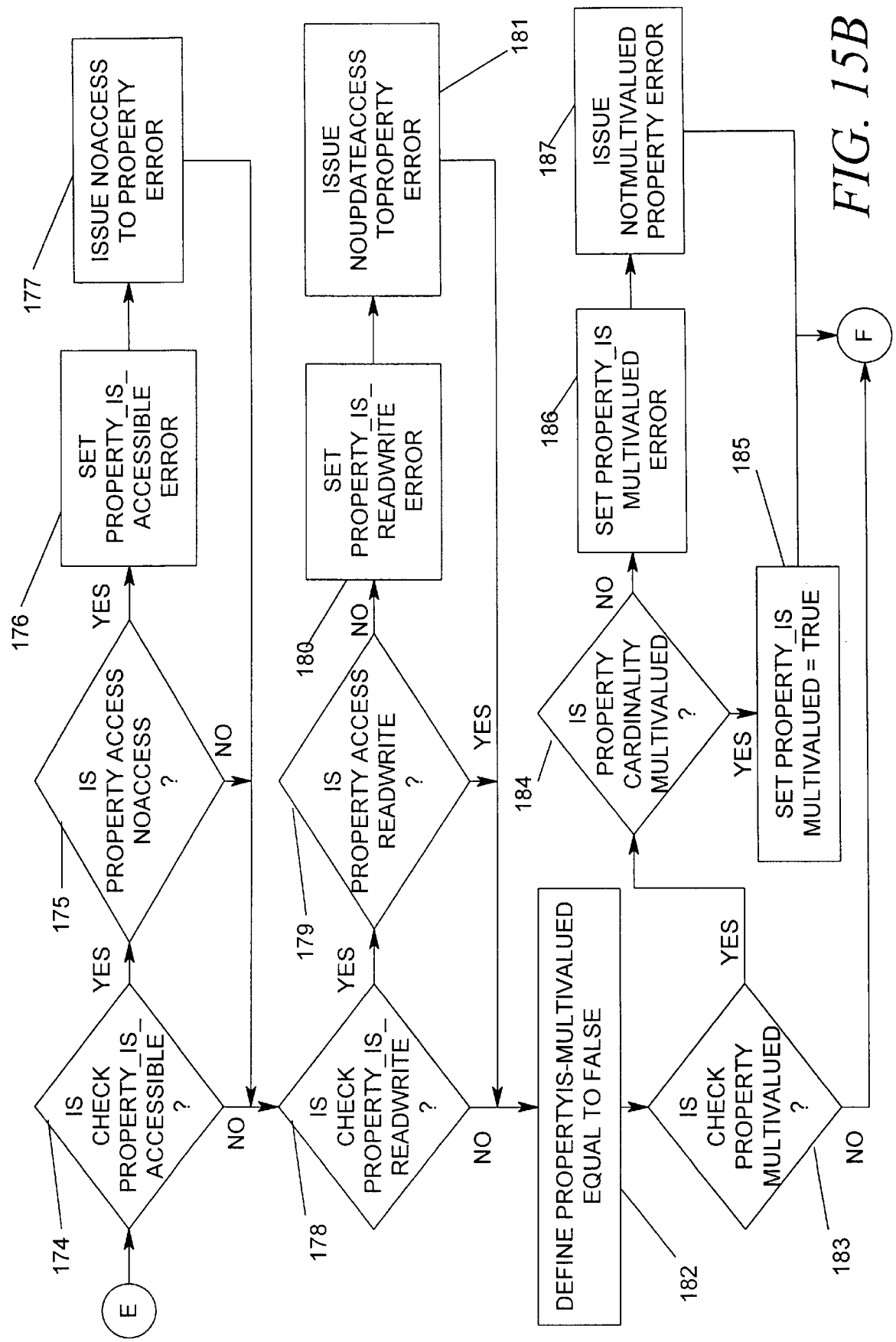

Referring now to FIG. 15B at the connector E, an inquiry is made if checking condition CHECK_PROPERTY_IS_ACCESSIBLE (diamond 174). If the answer to this inquiry is yes, then another inquiry is made as to whether or not the access value of the property is noAccess (diamond 175). If the answer to this second inquiry is yes, then a process step of setting PROPERTY_IS_ACCESSIBLE error flag is performed (block 176). Next, a noAccessToProperty error is issued (block 177). After this step or if the answer to the inquiry in the diamonds 174 and 175 is no, yet another inquiry is made as to whether or not checking condition is CHECK_PROPERTY_IS_READWRITE (diamond 178).

If the answer to the inquiry at diamond 178 is yes, then another inquiry is made as to whether or not the access value of property is not readWrite (diamond 179). If the answer to the inquiry in the diamond 179 is no, then a process step of setting PROPERTY_IS_READWRITE error flag is performed (block 180), followed by a step of issuing a noUpdateAccessToProperty error (block 181). After this, or if the answer in the diamond 178 is no or the diamond 179 is yes, a process step of defining a flag propertyIsMultivalued equal to FALSE (block 182).

Following the above, an inquiry is next made as to whether or not checking condition CHECK_PROPERTY_IS_MULTIVALUED (diamond 183). If the answer to this inquiry is yes, then another inquiry is made as to whether or not the cardinality of the property is multi-valued (diamond 184). If the answer to this inquiry is yes, then propertyIsMultivalued is set equal to true (block 185). If the cardinality value of property is not multi-valued a PROPERTY_IS_MULTIVALUED error flag is set (block 186) and a notMultivaluedProperty error is issued (block 187). After completion of the process steps depicted by the blocks 185 or 187, or if the answer to the inquiry depicted by the diamond 183 is no, then a branch is made to the next sheet of the drawings as denoted by a connector F.

Figure 15C:
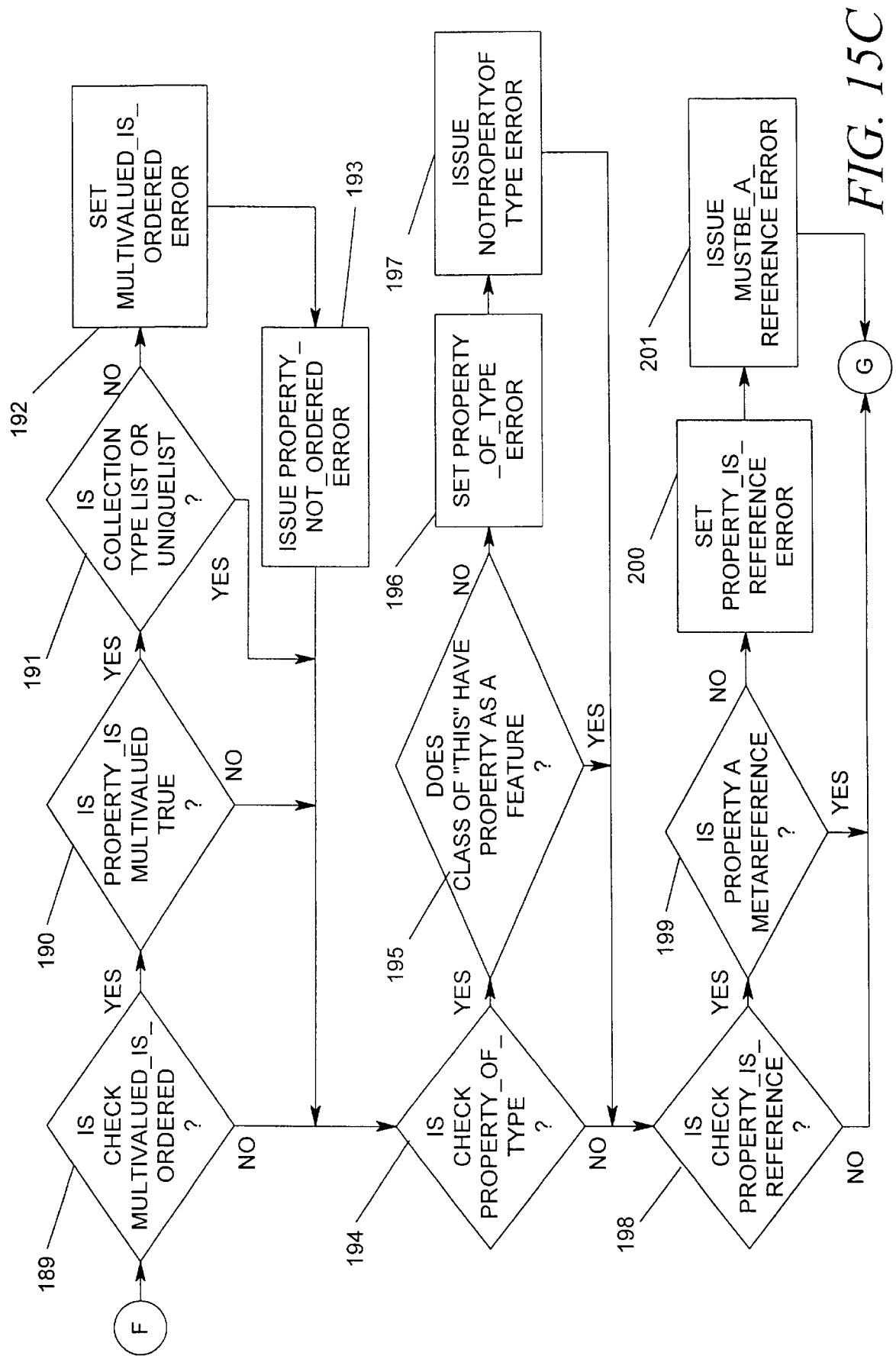

Referring now to FIG. 15C at the connector F, an inquiry is made as to whether or not checking condition CHECK_MULTIVALUED_IS_ORDERED (diamond 189). If the answer to this inquiry is yes then another inquiry is made as to whether or not propertyIsMultivalued is TRUE (diamond 190), and if the answer to this inquiry is yes then still another inquiry is made as to whether or not collection type of property is not list or uniqueList (diamond 191). If the answer to this latter inquiry is no, then a MULTIVALUED_IS_ORDERED error flag is set (block 192). Next, a propertyIsNotOrdered error is issued (block 193).

After completion of the step depicted by the block 193, or if the answer to the inquiries depicted by the diamonds 189, 190 is no, or the answer to the diamond 191 inquiry is yes, still another inquiry is made as to whether or not checking condition CHECK_PROPERTY_OF_TYPE (diamond 194). If the answer to this inquiry is yes, then another inquiry is made as to whether or not the meta class of the target object does not have property as a feature (diamond 195). If the answer to this inquiry is no, then a PROPERTY_OF_TYPE error flag is set (block 196) followed by the issuing of a notPropertyOfType error (block 197). If the answer to the inquiry in the diamond 194 is no, or the diamond 196 is yes, and after completion of the step depicted by the block 197, still another inquiry is made as to whether or not checking condition CHECK_PROPERTY_IS_REFERENCE (diamond 198). If the answer to this inquiry is yes, then another inquiry is made as to whether or not property is a UrepMetaReference (diamond 199). If the answer to this inquiry is no then a PROPERTY_IS_REFERENCE error flag is set (block 200). Next, a mustBeReference error is issued (block 201). After completion of this step, or if the answer to the inquiry in the diamond 198 is no or the diamond 199 is yes, then a branch is made to the next sheet of the drawings at a connector G.

Referring now to FIG. 15D at the connector G, an inquiry is made as to whether or not checking condition CHECK_VALUE_IS_PERSISTENT (diamond 205). If the answer to this inquiry is yes, then an inquiry is made as to whether or not the classification of value is not aPersistentObject (diamond 206). If the answer to this inquiry is no, then a VALUE_IS_PERSISTENT error flag is set (block 207), followed by issuing an invalidValueTypeError (block 208).

If the answer to the inquiry depicted by the diamond 205 is no, or the diamond 206 is yes, or after completion of the step depicted by the block 208, another inquiry is made as to whether or not checking condition CHECK_REQUIRED_NOT_NULL (diamond 209). If the answer to this inquiry is yes, then yet another inquiry is made as to whether or not value is null and property is required (block 210). If the answer to this inquiry is no, then a REQUIRED_NOT_NULL error flag is set (block 211), followed by issuing a requiredPropertyWillBeNull error (block 212).

After completion of the step depicted by the block 212, or if the answer to the inquiry depicted by the diamond 209 is no, or the diamond 210 is yes, still another inquiry is made as to whether or not checking condition CHECK_VALUE_MATCHES_CARDINALITY (diamond 213). If the answer to this inquiry is yes, then another inquiry is made if not any of the following: classification of value is aPersistentObject and property cardinality is single-valued; or, classification of value is a UrepCollection and property cardinality is multi-valued; or, classification of value is aDataType and property cardinality is single-valued (diamond 214). If the answer to this inquiry is no, then a branch is made to the next sheet of the drawings at a connector H. If the answer to the inquiry depicted by the diamond 213 is no or the diamond 214 is yes, then a branch is made to the next sheet of the drawings at a connector I.

Figure 15E:
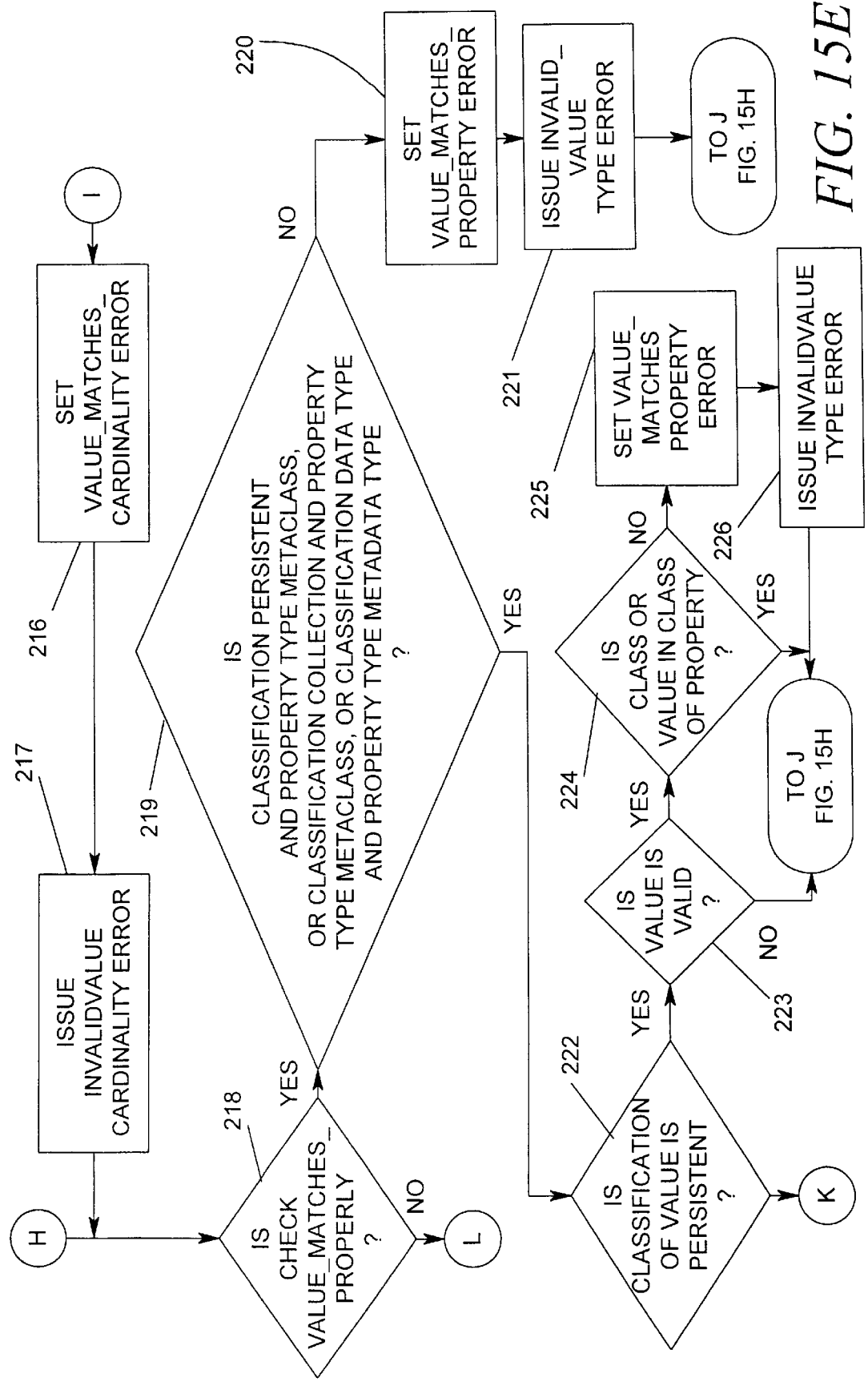

Referring now to FIG. 15E at the connector I, a process step of setting a VALUE_MATCHES_CARDINALITY error flag is depicted (block 216). Next, an invalidValueCardinality error is issued (block 217) followed by an inquiry as to whether or not checking condition CHECK_VALUE_MATCHES_PROPERTY (diamond 218). If the answer to this inquiry is yes, then an extensive inquiry is made if not any of the following: classification of value is aPersistentObject and property type is a UrepMetaClass; or, classification of value is a UrepCollection and property type is a UrepMetaClass; or, classification of value is aDataType and property type is a UrepMetaDataType (diamond 219). If the answer to this inquiry is no, then a VALUE_MATCHES_PROPERTY error flag is set (block 220), followed by issuing an invalidValueType error (block 221). Following this step, a branch is made to a connector J in FIG. 15H and described hereinafter.

If the answer to the inquiry at diamond 219 is yes, then another inquiry is made if classification of value is aPersistentObject (diamond 222). If the answer to this inquiry is yes, then another inquiry is made if value is valid (diamond 223); and, if yes yet another inquiry is made if the class of the value is not within the class of the property (diamond 224). If the answer to this inquiry is no, then a VALUE_MATCHES_PROPERTY error flag is set (block 225), followed by issuing an invalidValueType error (block 226).

If the answer to the inquiry at the diamond 223 is no, or the diamond 224 is yes, or upon completion of the step depicted by the block 226, a branch is taken to a connector J in FIG. 15H, which will be described further hereinafter. If the answer to the inquiry at the diamond 222 is no, then a branch is made to the next sheet of the drawings at a connector K.

Figure 15F:
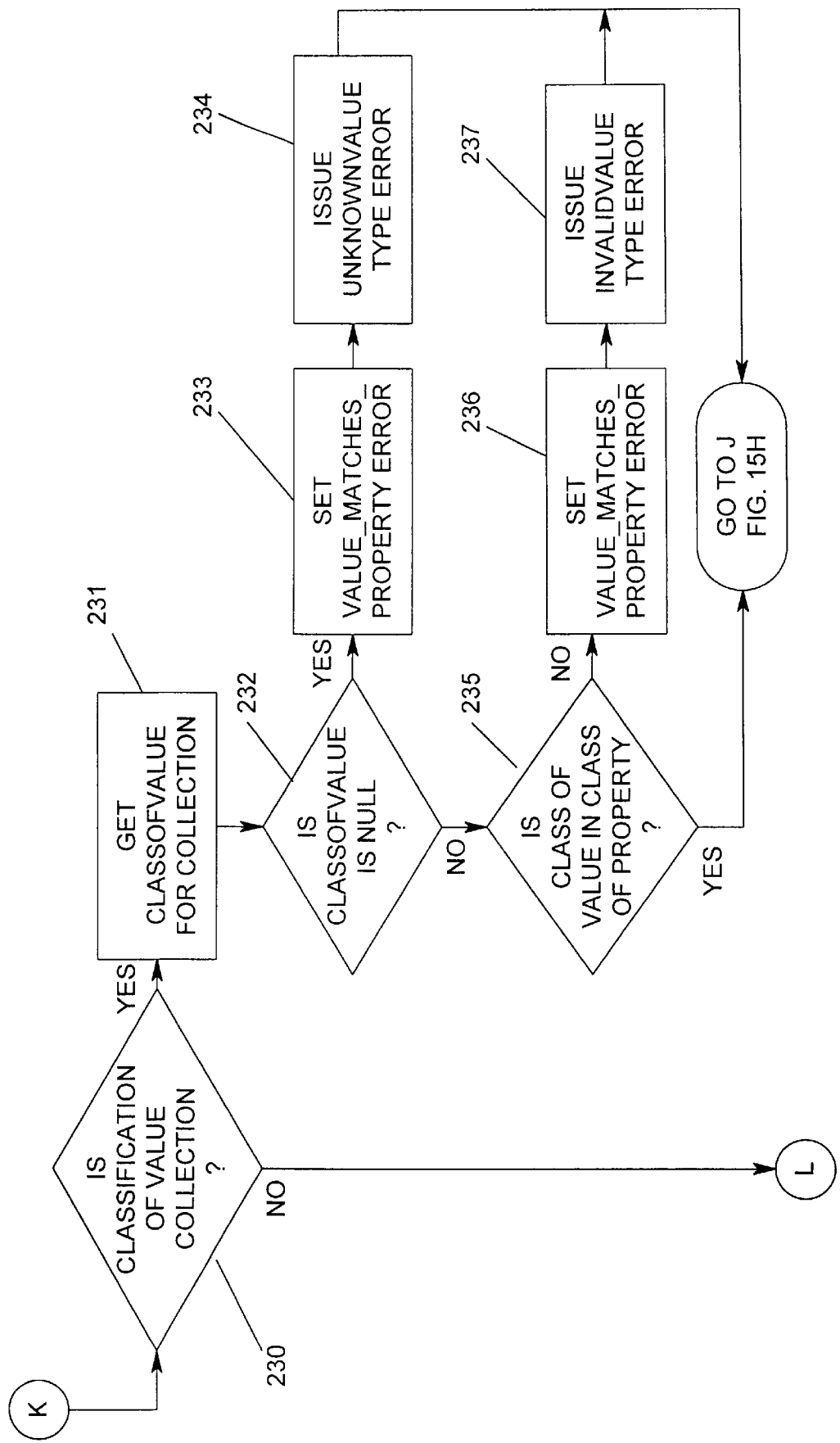

Referring now to FIG. 15F at the connector K, an inquiry is made if classification of value is aUrepCollection (diamond 230). If the answer to this inquiry is yes, then a process step of getting the classOfValue for the collection type value is performed (block 231). Another inquiry is made if classOfValue is null (diamond 232), and if yes a VALUE_MATCHES_PROPERTY error flag is set (block 233), followed by issuing an invalidValueType error (block 234).

If the answer to the inquiry at the diamond 232 is no, then another inquiry is made if classOfValue is not within the class of property (diamond 235). If the answer to this inquiry is no, then a VALUE_MATCHES_PROPERTY error flag is set (block 236), followed by issuing an invalidValueType error (block 237). Returning to the decision diamond 230, if the answer to this inquiry is no, then a branch is made to the next sheet of the drawings at a connector L. If the answer to the inquiry in the diamond 235 is yes, or upon completion of the steps depicted by the blocks 234 or 237, then a branch is made to FIG. 15H at the connector J.

Figure 15G:
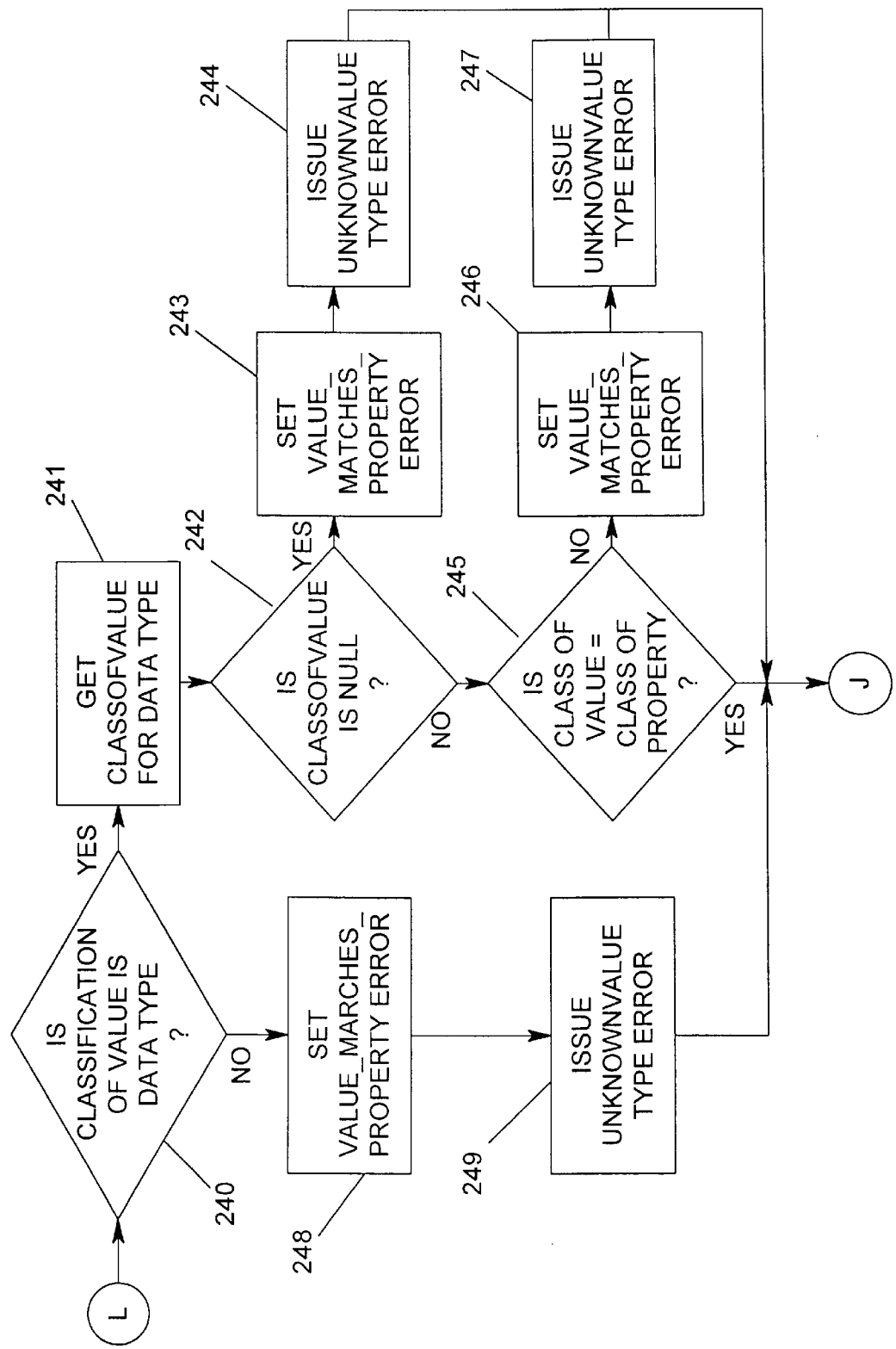

Referring now to FIG. 15G at the connector L, an inquiry is made if classification of value is aUrepDataType (diamond 240). If the answer to this inquiry is yes, then a process step of getting the classOfValue for the data typed value is performed (block 241). Next, an inquiry is made if classOfValue is null (diamond 242). If the answer to this inquiry is yes, then a process step of setting VALUE_MATCHES_PROPERTY error flag is performed (block 243), followed by issuing an invalidValueType error (block 244).

If the answer at decision diamond 242 is no, then another inquiry is made if classOfValue does not match the class of the property (diamond 245). If the answer to this inquiry is no, then a VALUE_MATCHES_PROPERTY error flag is set (block 246) followed by issuing an invalidValueType error (block 247). If the answer to the inquiry at diamond 240 is no, then classOfValue does not match the class of the property. Thus, a VALUE_MATCHES_PROPERTY error flag is set (block 248) and an inalidValueType error is issued (block 249). Upon completion of this step, or if the answer to the inquiry in the diamond 245 is yes, or upon completion of the steps depicted by the blocks 244 or 247, a branch is made to the next sheet of the drawings at the connector J.

Figure 15H:
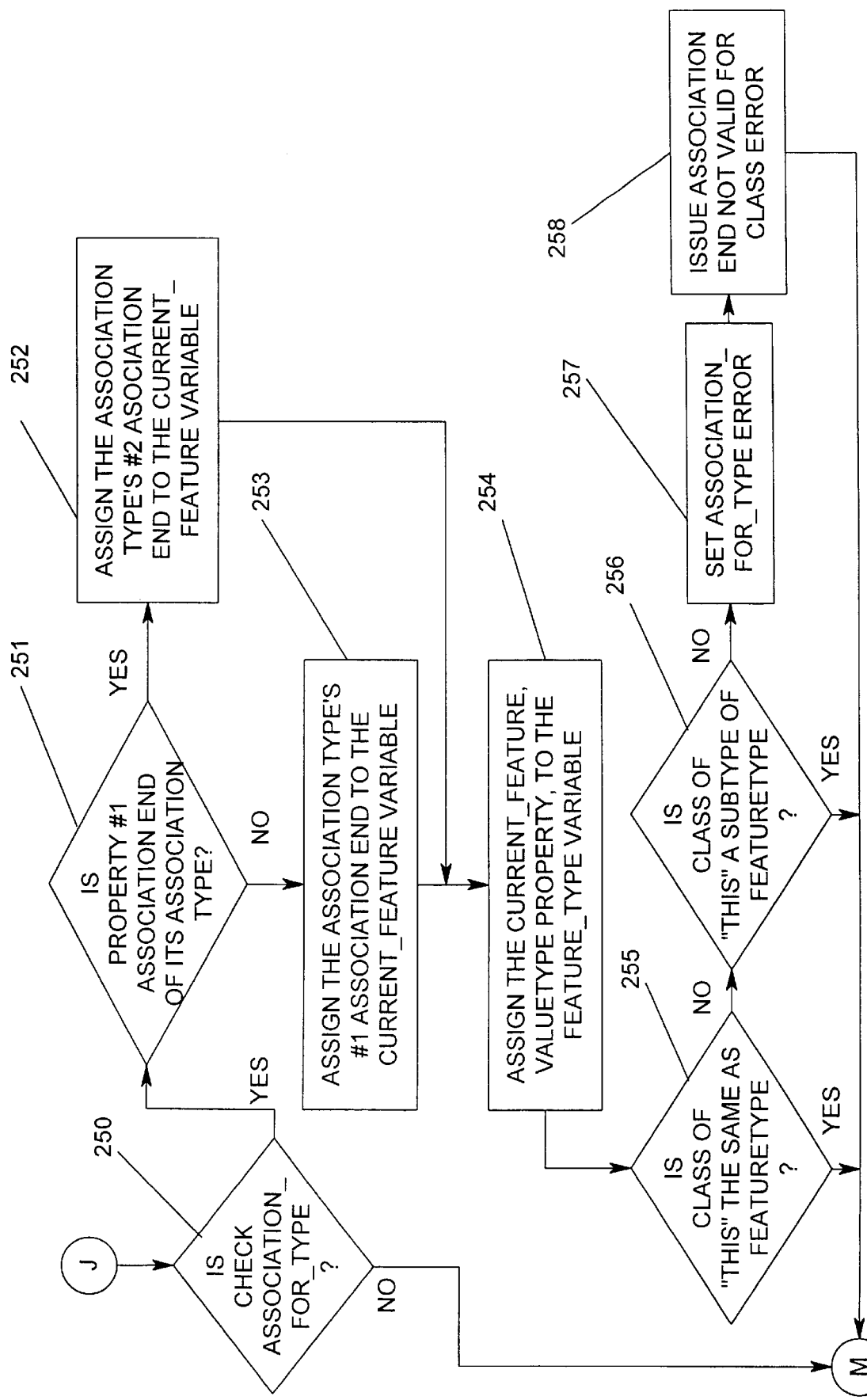

Referring now to FIG. 15H at the connector J, an inquiry is made as to whether or not check is for ASSOCIATION_FOR_TYPE (diamond 250). If the answer to this inquiry is yes, then another inquiry is made as to whether or not property is association end #1 of its association type (diamond 251). If the answer to this latter inquiry is yes, then the association type's #2 association end is assigned to the Current_Feature variable (block 252). On the other hand, if the answer to the inquiry in the diamond 251 is no, then the association type's #1 association end is assigned to the Current_Feature variable (block 253). Upon completion of the step depicted by the block 252 or the block 253, the valueType of Current_Feature is assigned to the Feature_Type variable (block 254).

Following the above, still another inquiry is made as to whether or not the class of "this" is the same as featureType (diamond 255). If the answer to this inquiry is no, then another inquiry is made as to whether or not class of "this" is a subtype of featureType (diamond 256). If the answer to this latter inquiry is no, then an ASSOCIATION_FOR_TYPE error is set (block 257) and an associationEndNotValidForClass error is issued (block 258). Upon completion of this latter step, or if the answer to the inquiry in the diamond 250 is no, or the inquiry in the diamonds 255 and 256 are yes, a branch is made to the next sheet of the drawings at a connector M.

Figure 15J:
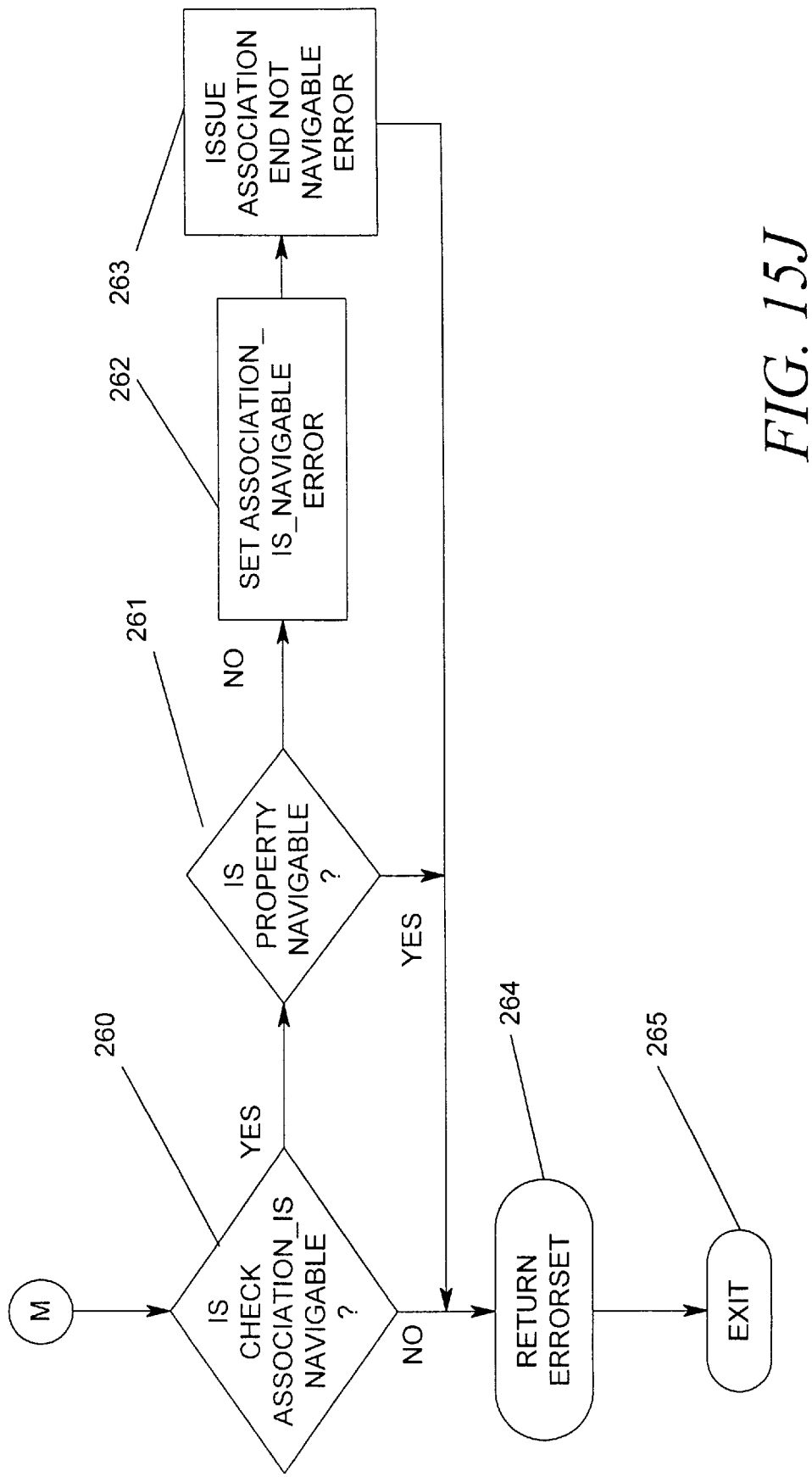

Referring now to FIG. 15J at the connector M, an inquiry is made as to whether or not check ASSOCIATION_IS_NAVIGABLE (diamond 260). {It is pointed out that 151 was intentionally omitted for FIG. Numbers in order to avoid confusion.} If the answer to the inquiry in the diamond 260 is yes, then another inquiry is made as to whether or not property is navigable (diamond 261). If the answer to this inquiry is no, then an ASSOCIATION_IS_NAVIGABLE error is set (block 262). Next, an associationEndNotNavigable error is issued (block 263). Upon completion of this step, or if the answer to the inquiry in the diamond 260 is no or the diamond 261 is yes, then an errorSet is returned (bubble 264) and the process is exited (bubble 265).

Figure 16A:
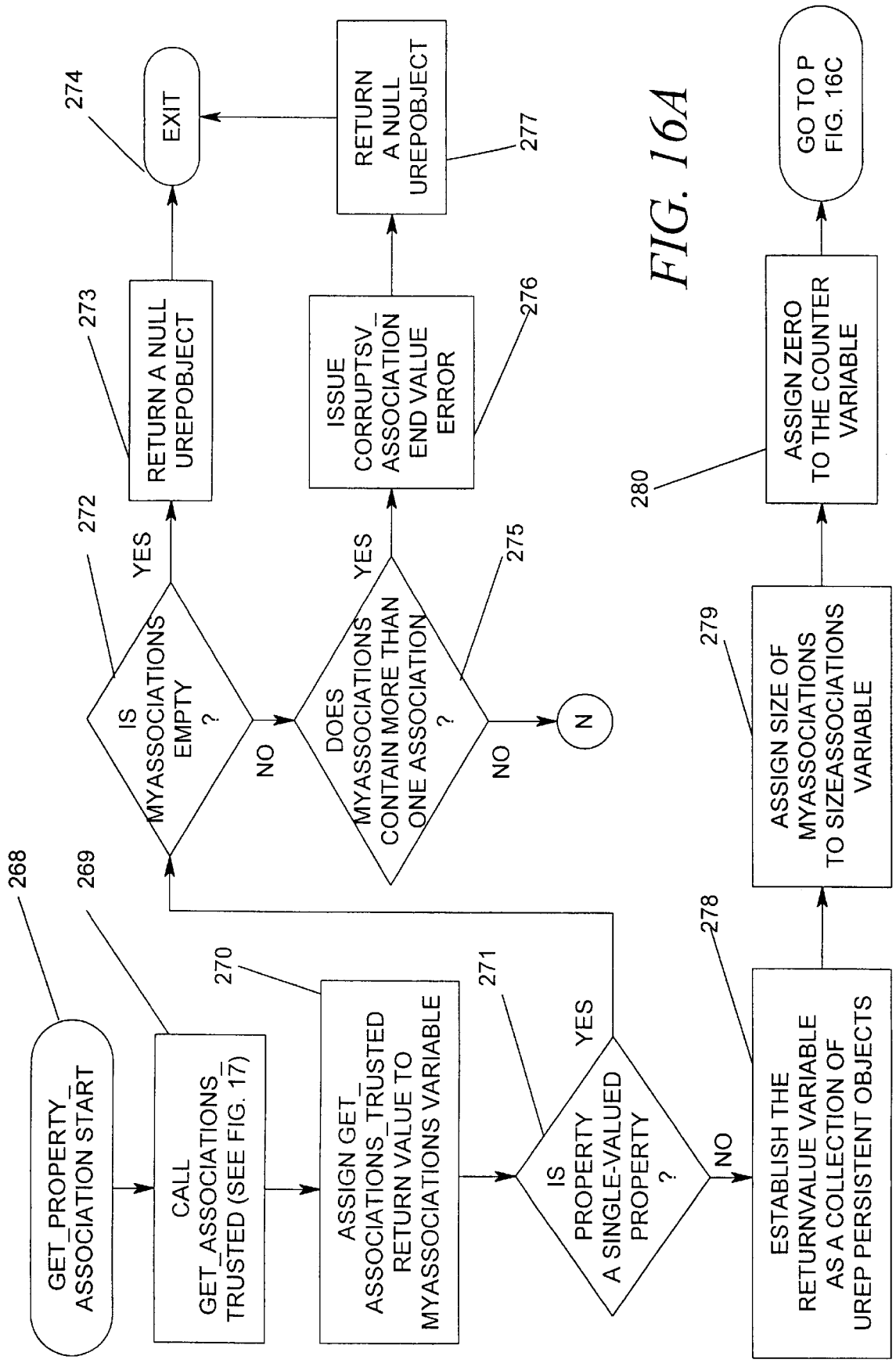
FIGS. 16A through 16C combined form a flow chart illustrating the process for getting property associations (getProperty_Association).
Figure 17:
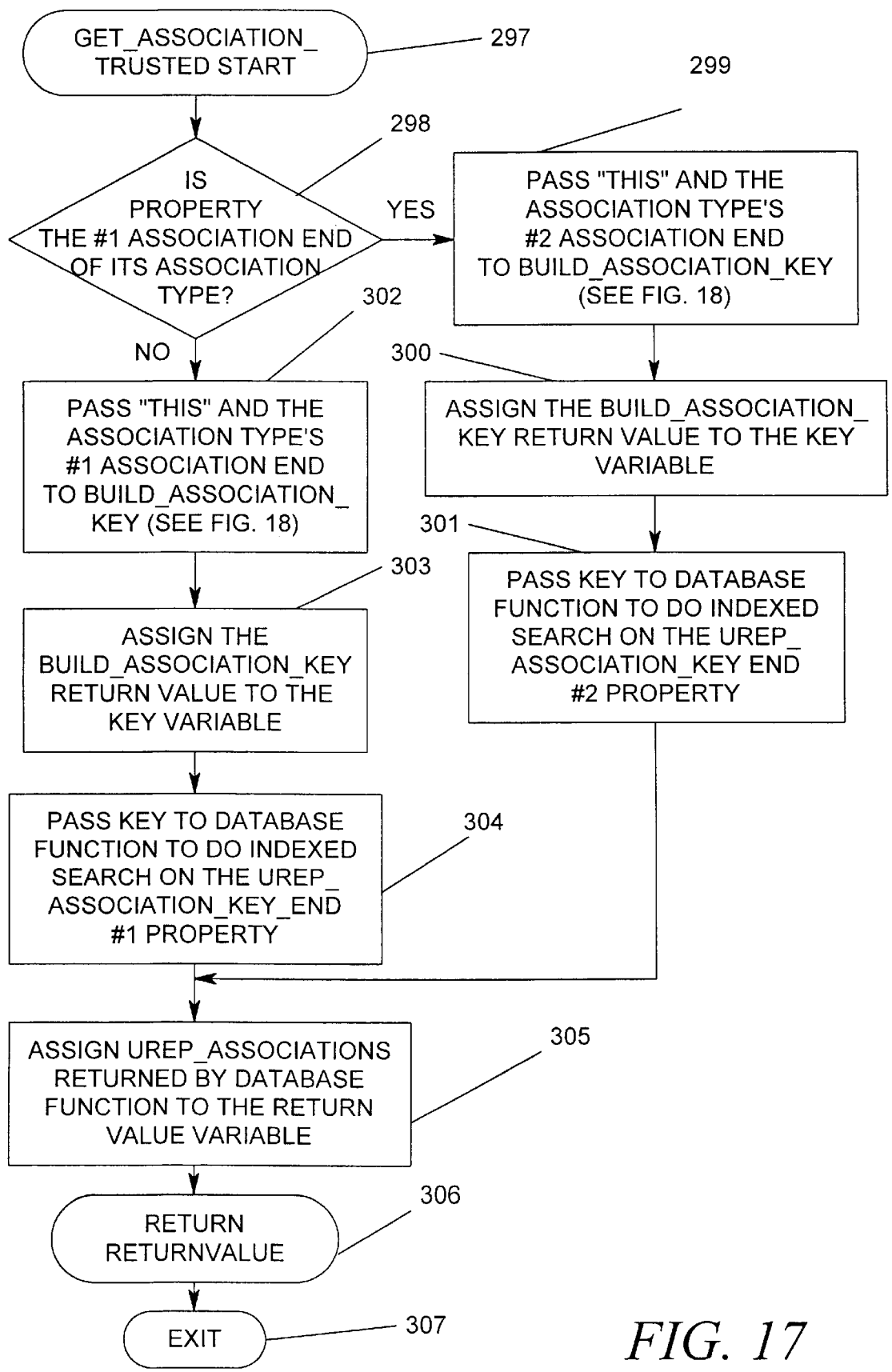
FIG. 17 is a flow chart illustrating the process for getting associations trusted (getAssociations_Trusted).

Referring now to FIG. 16A the first of a two sheet illustration of the process for Get_Property_Association is shown. The process begins with a start bubble 268 followed by a step of calling the Get_Associations_Trusted process, which is illustrated in FIG. 17 and amplified herein (block 269). Next, the return value for the Get_Associations_Trusted call is assigned to a myAssociations variable (block 270). After this, an inquiry is made as to whether or not property is a single-valued property (diamond 271). If it is, then another inquiry made as to whether or not myAssociations is empty (diamond 272), and if it is a null UREPobject is returned (block 273) and the process is exited (bubble 274).

Returning back to the diamond 272, if myAssociations is not empty, then another inquiry is made as to whether or not myAssociations contain more than one association (diamond 275), and if yes, a corruptSV_Association_End value error is issued (block 276). After this, a null UREPobject is returned (block 277) and the process is exited. It is noted that if myAssociations does not contain more than one association a branch is taken to the next sheet of the drawings at a connector N. Returning back to the diamond 271, if the property is not single-valued, then the returnValue variable is established as a collection of UREP persistent objects (block 278). Following this, the size of myAssociations is assigned to a sizeAssociations variablector (block 279). Next, zero is assigned to the counter variable (block 280). After completion of this step, a branch is taken to a connector P in FIG. 16C.

Figure 16B:
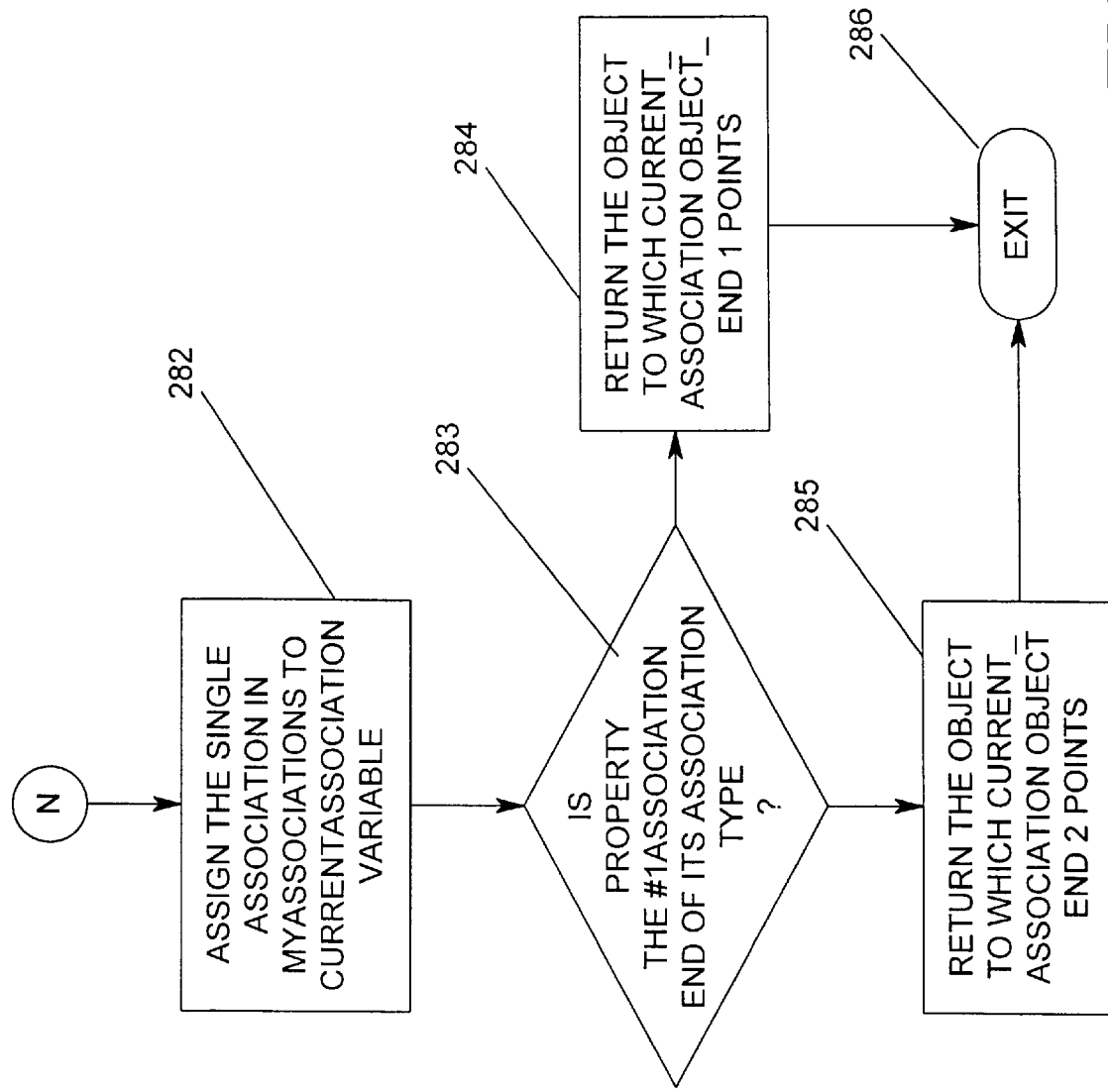

Referring now to FIG. 16B at the connector N, the single association in myAssociations is assigned to the currentAssociation variable (block 282). Next, an inquiry is made as to whether or not property is the #1 association end of its association type (diamond 283). If the answer to this inquiry is yes, then the object to which the current_Association object_End 1 points is returned (block 284) and the process exits (bubble 285). On the other hand, if the property is not the #1 association end of its association type, then the object to which current association object end 2 points is returned (block 286).

Figure 16C:
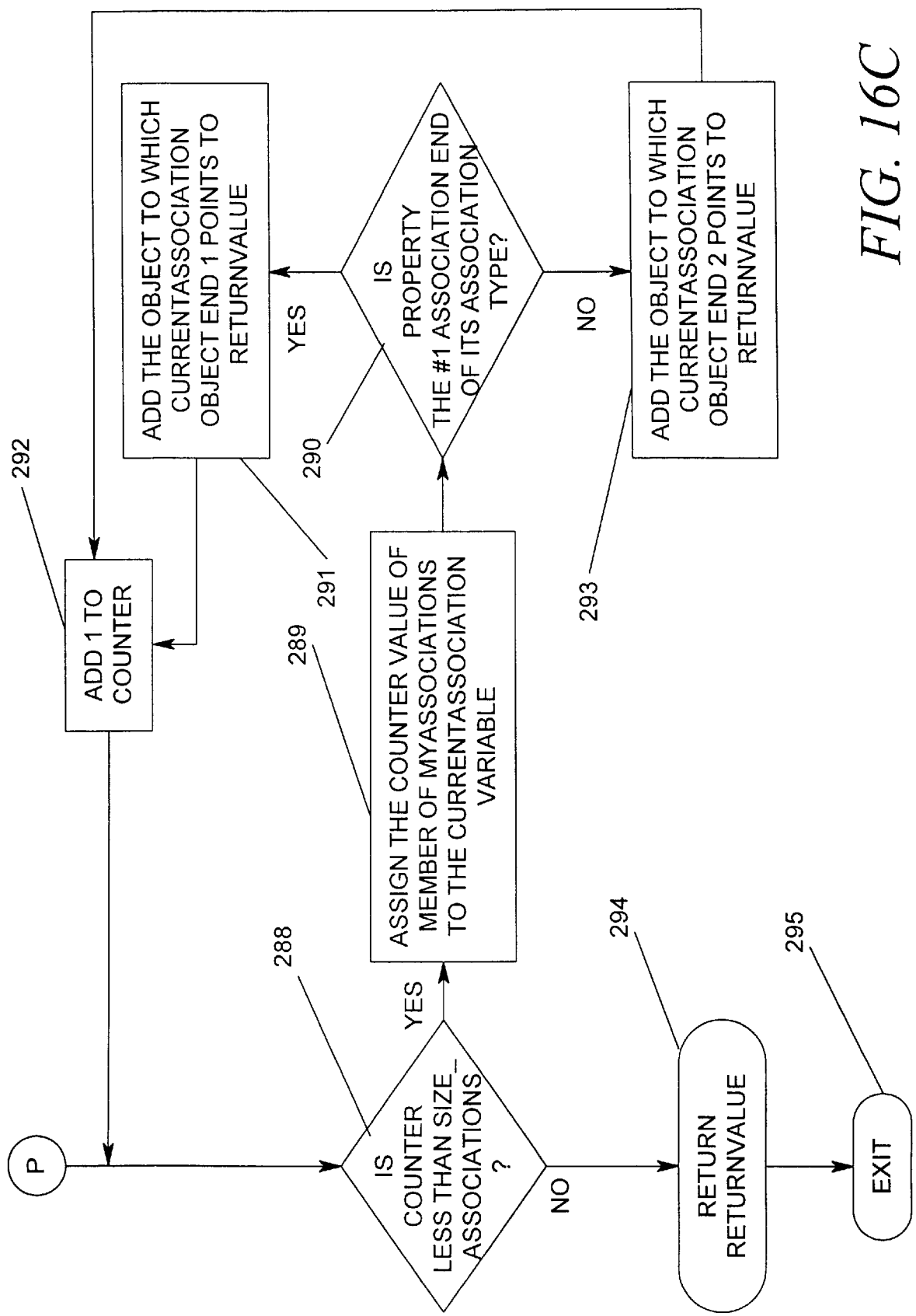

Referring now to FIG. 16C at the connector P, an inquiry is made as to whether or not the counter value is less than sizeAssociations (diamond 288). If the answer to this inquiry is yes, then the value in the counter associated with the member of myAssociations is assigned to the currentAssociation variable (block 289). Next, another inquiry is made as to whether or not property is the #1 association end of its association type (diamond 290). If the answer to this inquiry is yes, then the object to which the currentAssociation object end #1 points is added to the returnValue (block 291) and a one is added to the counter (block 292). On the other hand, if the answer to the inquiry in the diamond 290 is no, then the object to which the currentAssociation object end #2 points is added to the returnValue (block 293) and the counter is incremented by one (block 292). Returning to the diamond 288, if the counter value is not less than the sizeAssociations (i.e., it is greater than) then the returnValue is returned (bubble 294) and the process is exited (bubble 295).

Figure 18:
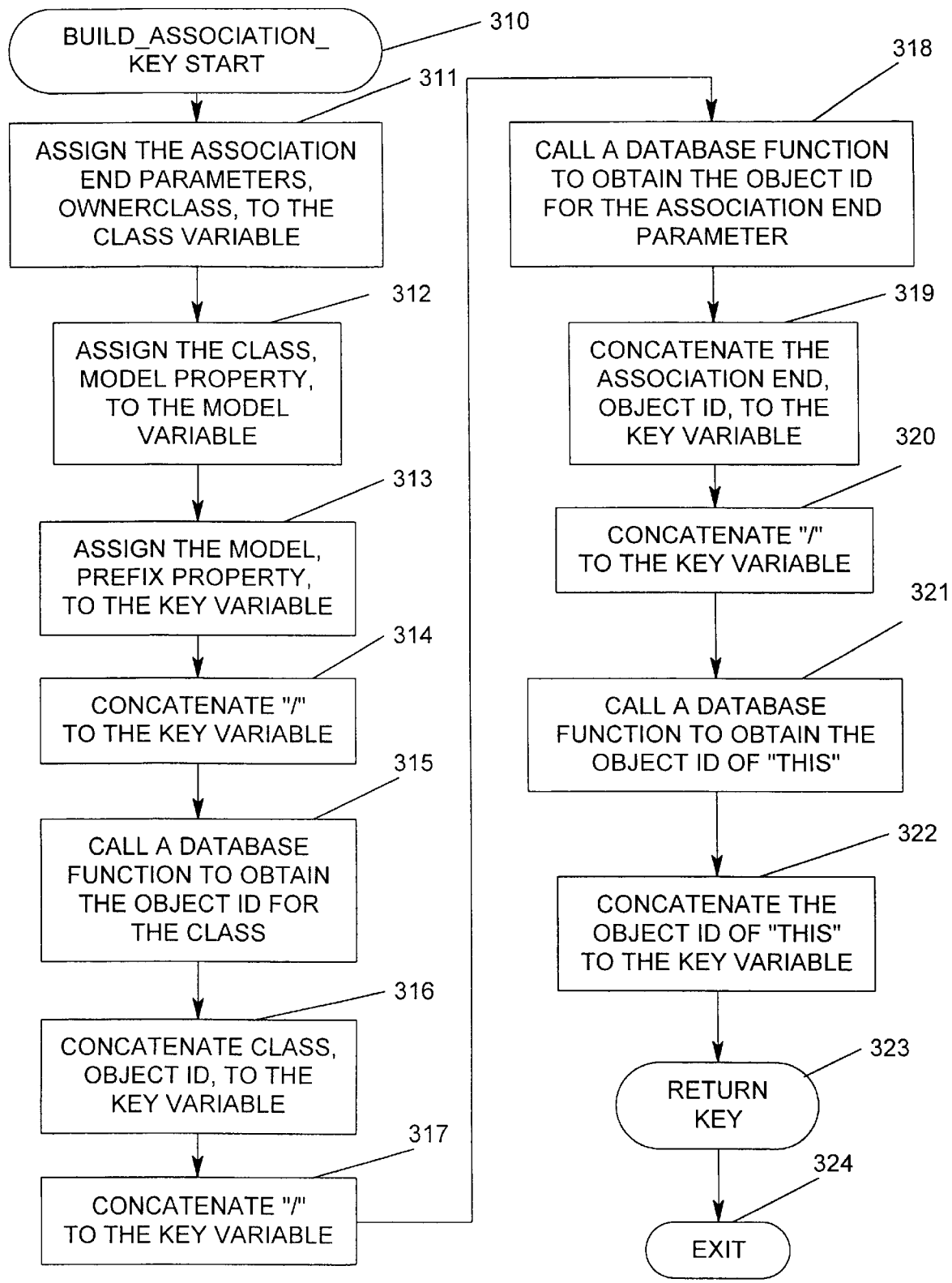
FIG. 18 is a flow chart illustrating the process for building association keys (Build_Associations_Key).

Referring now to FIG. 17, the process for getting an association trusted (i.e., get_Association_Trusted) is shown. The process begins with a start bubble 297 followed by an inquiry as to whether or not the property is the #1 association end of its association type (diamond 298). If the answer to this inquiry is yes, then "this" and the association type's #2 association end are passed to the Build_ Association_Key process (block 299), which process is illustrated in FIG. 18 and amplified hereinbelow. Next, the Build_Association_Key process return value is assigned to the key variable (block 300). After this, the key is passed to the database function to perform an indexed search on the UREP_Association_Key end #2 property (block 301).

Returning to the diamond 298, if the property is not the #1 association end of its association type, then "this" and the association type's #1 association end is passed to the Build_ Association_Key process (block 302). Next, the return value from the Build_Association_Key process is assigned to the key variable (block 303). After this, the key is passed to the database function to perform an indexed search on the UREP_Association_Key_End #1 property (block 304). The UREP_Associations returned by the database function is assigned to the return value variable (block 305). The returnValue is returned (bubble 306) and the process exits (bubble 307). It is pointed out that on completion of the step depicted by the block 301 a branch is made to the process step depicted by the block 305.

Referring now to FIG. 18, the process for Build_ Association_Key is illustrated. The process begins with a start bubble 310 followed by a step of assigning the association end parameters, ownerClass, the class variable (block 311). Next, the class, model property, is assigned to the model variable (block 312) and the model, prefix property is assigned to the key variable (block 313). Following this, "/" is concatenated to the key variable (block 314) and a call is made to the database function to obtain the object ID for the class (block 315). The class, object ID, is concatenated to the key variable (block 316) and "/" is concatenated to the key variable (block 317).

Following the above, a database function is called to obtain the object ID for the association end parameter (block 318), and the association end, object ID, is concatenated to the key variable (block 319). Again, "/" is concatenated to the key variable (block 320). Next, a database function is called to obtain the object ID of "this" (block 321) and the object ID of "this" is concatenated to the key variable (block 322). Finally, the key is returned (bubble 323) and the process exits (bubble 324).

Figure 19A:
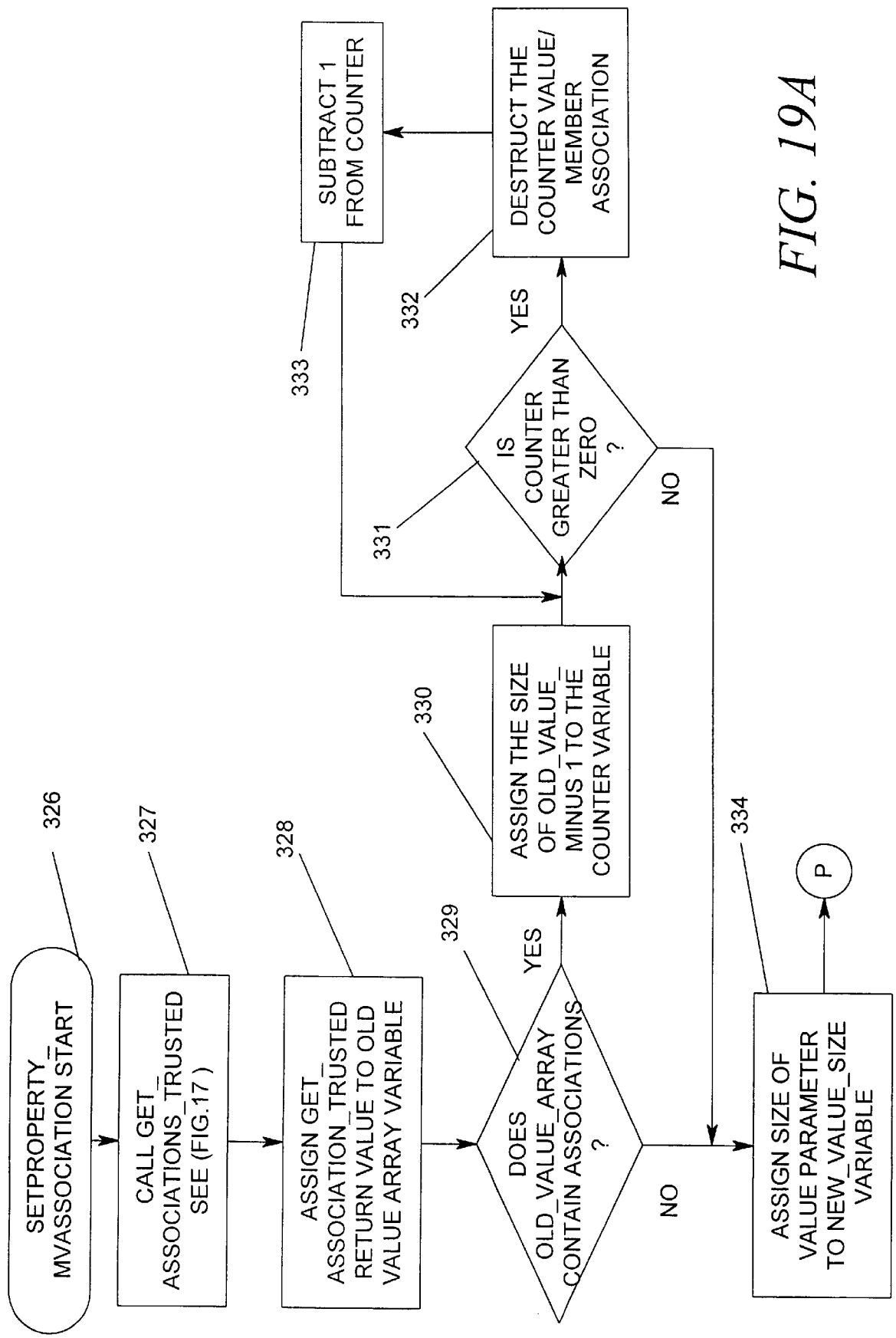
FIGS. 19A and 19B combined form a flow chart illustrating the process for setting property multi-valued association (i.e., setProperty_MVAssociation).

Referring now to FIG. 19A, the first of a two-sheet illustration of the process for setProperty_MVAssociation is shown. The process begins with a start bubble 326 followed by a step of calling the getAssociations_Trusted process (block 327), which is illustrated in FIG. 17 and amplified hereinabove. Next, the return value from the getAssociation_Trusted process is assigned to the old value array variable (block 328). After this, an inquiry is made as to whether or not the old value array contains associations (diamond 329). If the answer to this inquiry is yes, then the size of the old value minus 1 is assigned to the counter variable (block 330).

Another inquiry is made as to whether or not the counter value is greater than zero (diamond 331), and if so, the counter value/member association is destructed (block 332). After this, 1 is subtracted from the counter (block 333) and a return is made back to the diamond 331. When the counter value is not greater than zero, or when the answer to the inquiry in the diamond 329 is no, then the size of the value parameter is assigned to a new value size variable (block 334). Following this, the process illustration continues in FIG. 19B at a connector P.

Figure 19B:
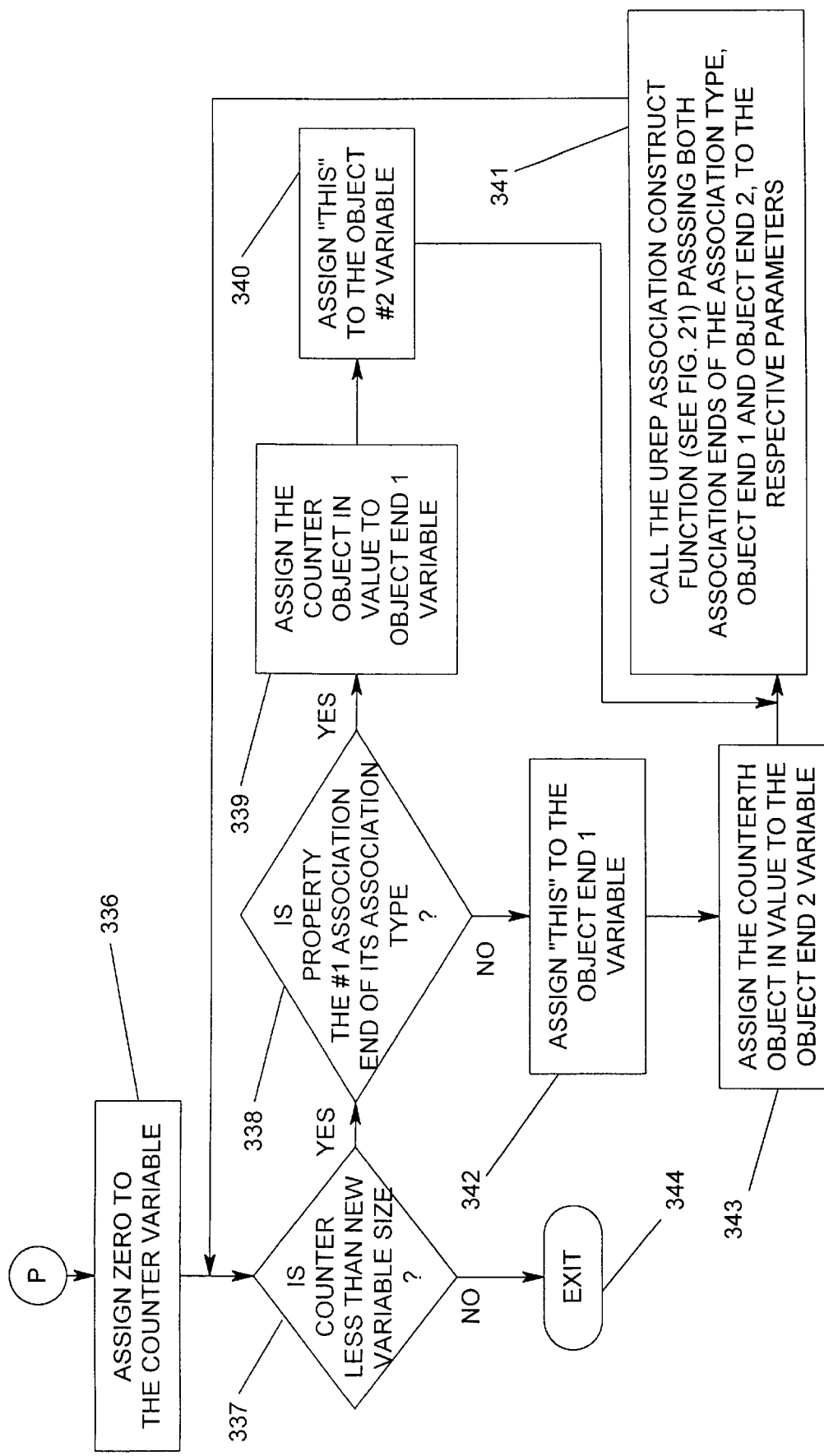

Referring now to FIG. 19B at the connector P, the value of zero is assigned to the counter variable (block 336). Next, an inquiry is made as to whether or not the counter value is less than the new variable size (diamond 337). If the answer to this inquiry is yes, then another inquiry is made as to whether or not property is the #1 association end of its association type (diamond 338). If the answer to this second inquiry is yes, then the value of the counter object is assigned to the object end #1 variable (block 339). Next, "this" is assigned to the object #2 variable (block 340).

Following the above, the UREP Association Construct function is called (see FIG. 21) thereby passing both association ends of the association type, object end #1 and object end #2, to the respective parameters (block 341). A return is next made back to the inquiry in the diamonds 337 and 338. When the answer to the inquiry in the diamond 338 is no, then "this" is assigned to the object end #1 variable (block 342). After this, the counterth object in value is assigned to the object end #2 variable (block 343). Then, the Association Construct function is called again, and a return is made back to the diamond 337. Once the counter is not less than the new variable size (no exit of the diamond 337), then the process is exited (bubble 344).

Figure 20:
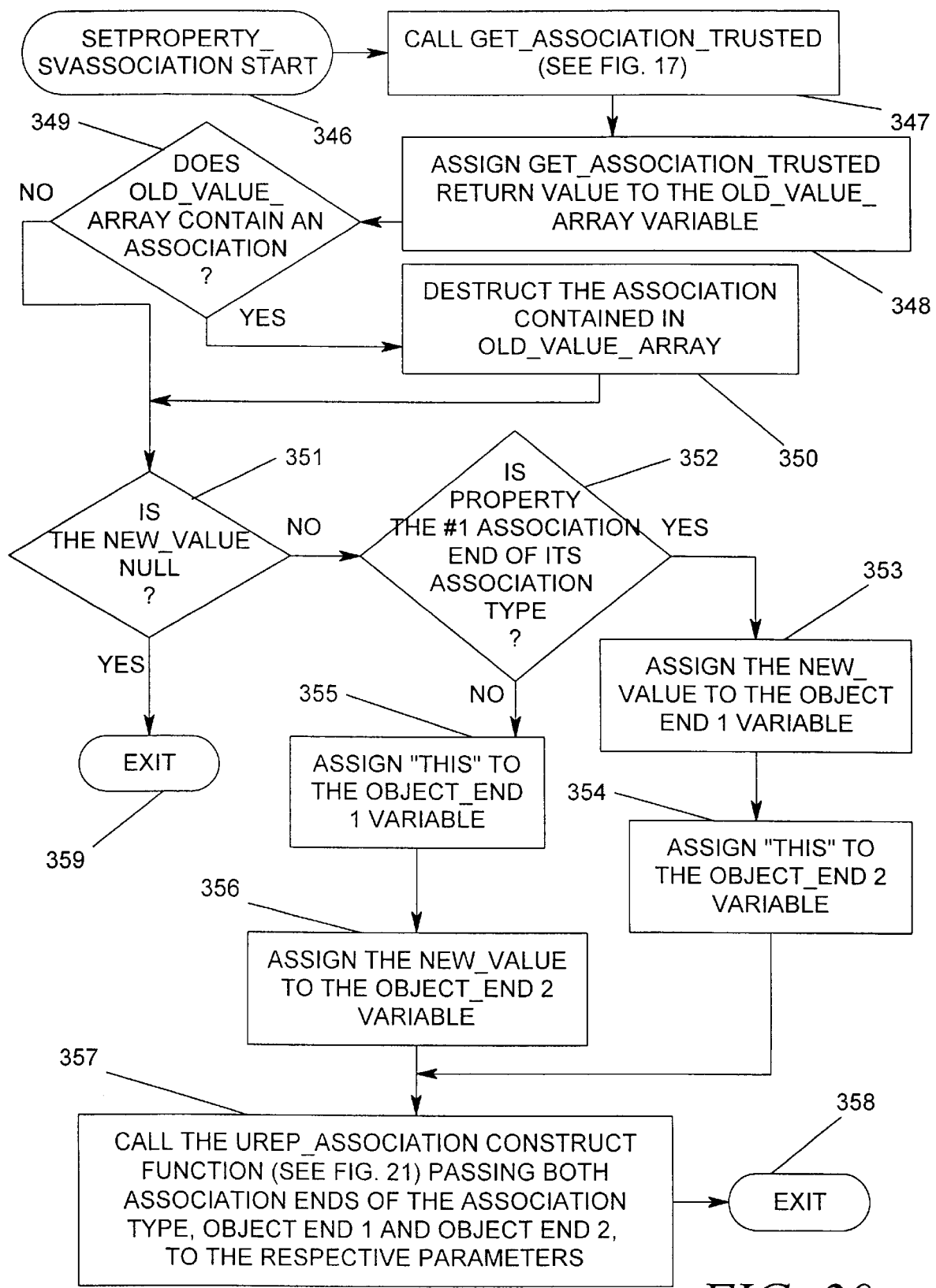
FIG. 20 is a flow chart illustrating the process for setting property single-valued association (i.e., setProperty_SVAssociation).

Referring now to FIG. 20, the setProverty_ SVAssociation process is shown. The process begins with a start bubble 346 followed by a step of calling the get_ Association_Trusted process, which is illustrated in FIG. 17 and amplified hereinabove (block 347). Next, the return value from the get_Association_Trusted process is assigned to the old_Value_Array variable (block 348). An inquiry is next made as to whether or not old_Value_Array contains an association (diamond 349). If the answer to this inquiry is yes, then the association contained in the old_ Value_Array is destructed (block 350). Upon completion of this step, or if the answer to the inquiry in the diamond 349 is no, then another inquiry is made as to whether or not new_Value is null (diamond 351).

If the new_Value is not null, then yet another inquiry is made as to whether or not property is the association end #1 of its association type (diamond 352). If the answer to this inquiry is yes, then the new_Value is assigned to the object end #1 variable (block 353). Next, "this" is assigned to the object_End #2 variable (block 354). On the other hand, if the answer to the inquiry in the diamond 352 is no, then "this" is assigned to the object_End #1 variable (block 355). After this, the new_Value is assigned to the object_End #2 variable (block 356). Upon completion of the step depicted by the block 354 or the block 356 the UREP_Association construct function is called (see FIG. 21, hereafter). Both the associations ends of the association type (i.e., object end #1 and object end #2) are passed to the respective parameters (block 357). After the construct is completed the process exits (bubble 358). It is noted that when the new_value is null (i.e., yes leg exit from the diamond 351) the process exits (bubble 359).

Figure 21:
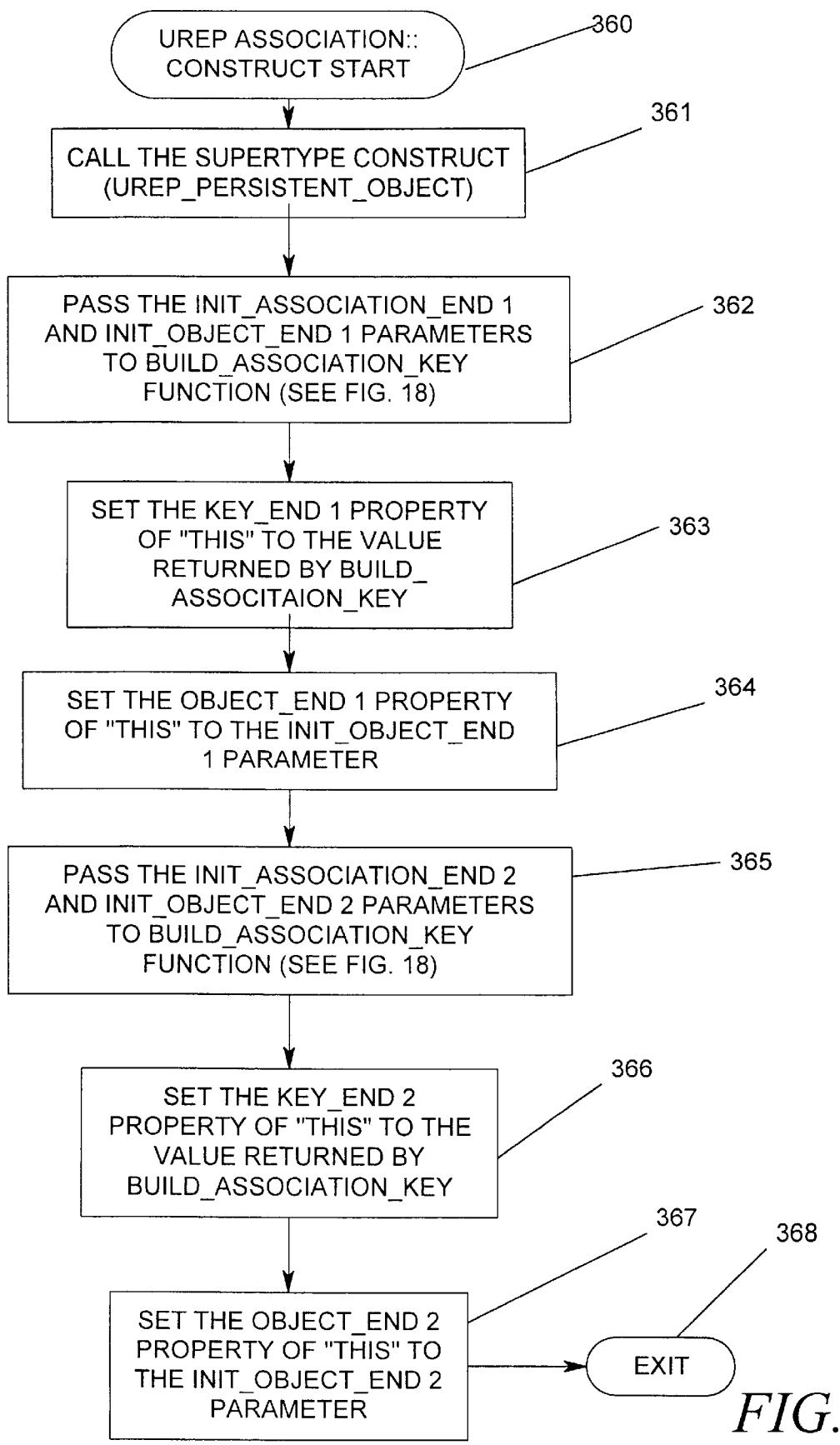
FIG. 21 is a flow chart illustrating the process for UREP_Association::Construct.

Referring now to FIG. 21, the process for the UREP Association::Construct is illustrated. The process begins with a start bubble 360 followed by a process step of calling the supertype construct (UREP_Persistent_Object) (block 361). Next, the Init_Association_End #1 and the Init_ Object_End #1 parameters are passed to the Build_

Association_Key function (block 362). This function is illustrated in FIG. 18 and amplified hereinabove. After this, the Key_End #1 property of "this" is set to the value returned by the Build_Association_Key process (block 363). The object_End #1 property of "this" is then set to the Init_Object_End #1 parameter (block 364). Next, the Init_Association_End #2 and Init_Object_End #2 parameters are passed to the Build_Association_Key function (block 365). The Key_End #2 property of "this" is then set to the value returned by the Build_Association_Key process (block 366). After this, the object_End #2 property of "this" is set to the Init_Object_End #2 parameter (block 367) and the process exits (bubble 368).

Figure 22:
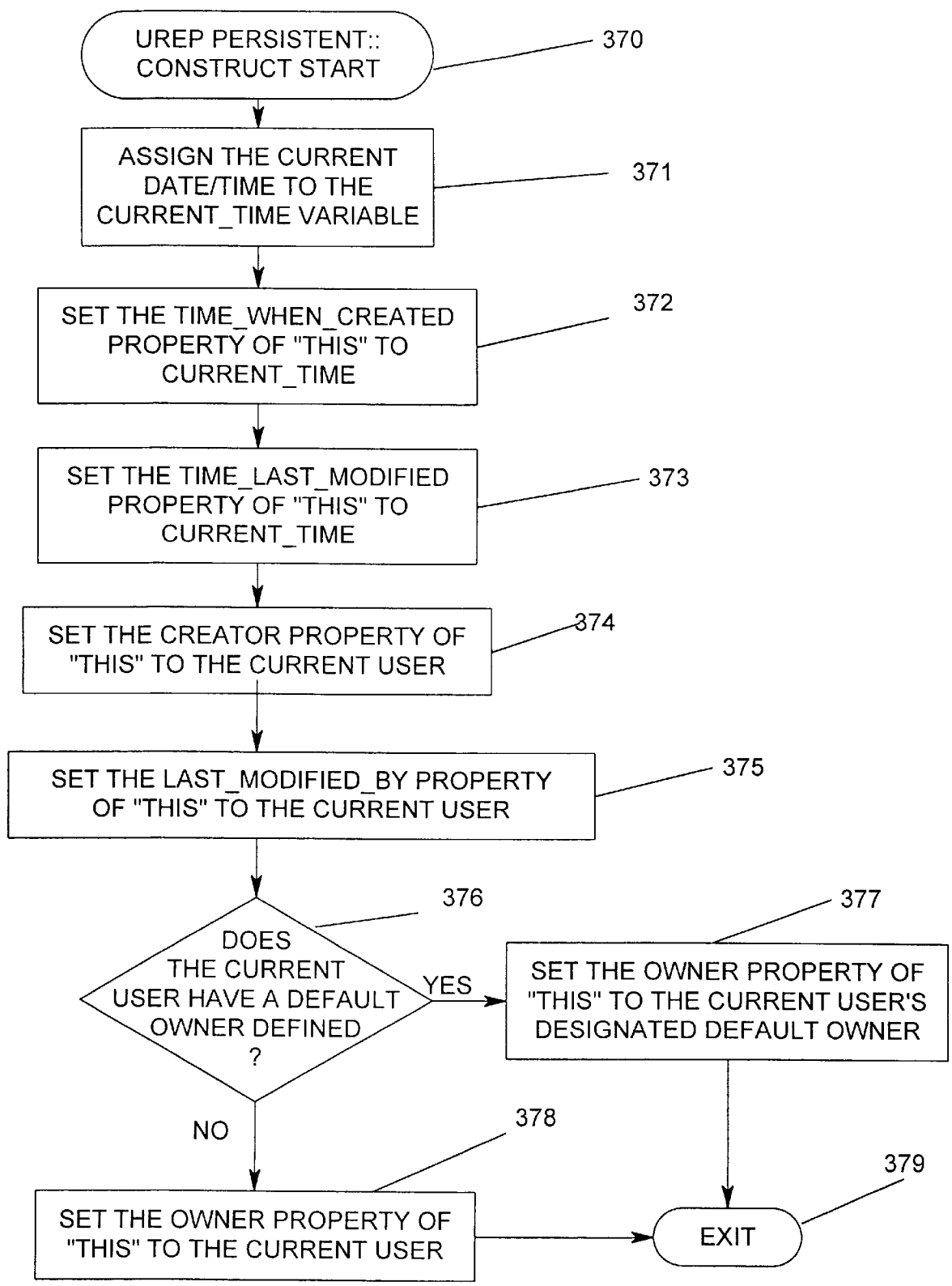
FIG. 22 is a flow chart illustrating the process for UREP_Persistent Object::Construct.

Referring now to FIG. 22, the UREP Persistent Construct process is illustrated. The process begins with a start bubble 370 followed by a step of assigning the current date/time to the Current_Time variable (block 371). Next, the Time_When_Created property of "this" is set to the Current_Time (block 372). The Time_Last_Modified property of "this" is then set to the Current_Time (block 373). After this, the creator property of "this" is set to the current user (block 375). Next, an inquiry is made as to whether or not the current user has a default owner defined (diamond 376). If the answer to this inquiry is yes, then the owner property of "this" is set to the current user's designated default owner (block 377). On the other hand, if the current user does not have a default owner defined then the owner property of "this" is set to the current user (block 378) and the process exits (bubble 379).

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In a computer system having a memory and a repository program operating therein, said repository program executing a method for associating classes contained in models stored in said memory, said method comprising the steps of:
   a. initializing each persistent type object in one of said models;
   c. creating at least two association-end objects;
   d. adding said association-end objects to a collection of features owned by said persistent type object;
   e. creating association objects that connect objects defined by persistent types associated by one of said association types;
   f. calling a setProperty function to specify an association between a first object and another object;
   g. passing to said setProperty function one of said two association end objects; and,
   h. said setProperty function interpreting the definition of said association type that owns said association-end parameter in order to determine whether:
      i). said association type is a valid association for associating objects of the persistent type which defines said first object;
      ii). said association type is a valid association for associating objects of the persistent type which defines the value object; and,
      iii). if said setProperty function determines that an association can be made, constructing an association instance object to link said first object to said another object.

2. The method as in claim 1 further comprising the step of setting a new value for an association from said first object by submitting a new value object to said setProperty function for said first object, whereby after said setProperty function has returned, said value object that was previously associated with said first object will no longer be associated with said first object and said new value will be associated with said first object.

3. The method as in claim 1 or 2 further comprising the step of disassociating an object from another object to which it is currently associated by submitting a null value parameter to said setProperty function, whereby after said setProperty function has returned, the two objects that were previously associated with said association object will no longer be associated.

4. The method as in claim 1 further comprising the steps of:
   a. retrieving an object that was associated with said first object;
   b. calling a getProperty function on said first object;
   c. passing one of said association-ends of said association type as a parameter, whereby said getProperty function interprets the definition of the association type that owns the association-end parameter to determine whether it is a valid association type for associating objects of the persistent type defining said first object;
   d. if said getProperty function determines that said association type is valid for said first object's persistent type, said association linking said first object to another object is retrieved;
   e. following said linking association instance object to a third object that is associated with said first object via said association object; and, f. returning said third object.

5. The method of claim 1 further comprising the step of returning an empty collection of objects if there are no objects currently associated with said first object.

6. In a computer system having a memory and a repository program operating therein, said repository program executing a method for associating classes contained in models stored in said memory, said method comprising the steps of:
   a. initializing each persistent type object in one of said models;
   b. for each persistent type object initialized in the preceding step, determining if said persistent type object is an association type, and if so;

c. creating at least two association-end objects;

d. adding said association-end objects to a collection of features owned by said persistent type object;

e. creating association objects that connect objects defined by persistent types associated by one of said association types;

f. calling a setProperty function to specify an association between a first object and a collection of objects;

g. passing to said setProperty function one of said two association end objects; and, h. said setProperty function interpreting the definition of said association type that owns said association-end parameter in order to determine whether:
   i). said association type is a valid association for associating objects of the persistent type which defines said first object;
   ii). said association type is a valid association for associating objects of the persistent type which defines the value objects; and,
   iii). if said setProperty function determines that an association can be made, constructing association instance objects to link said first object to said value objects.

7. The method as in claim 6 further comprising the step of setting a new value for an association from said first object by submitting a new collection of value objects to said setProperty function for said first object, whereby after said setProperty function has returned, all objects that were previously associated with said first object will no longer be associated and all objects that were included in said new value collection will be associated with said first object.

8. The method as in claim 6 further comprising the step of disassociating an object from all objects to which it is currently associated by submitting a null value parameter to said setProperty function, whereby after said setProperty function has returned, all objects that were previously associated with said first object will no longer be associated.

9. The method as in claim 6 further comprising the steps of:
   a. retrieving objects that were associated with said first object;
   b. calling a getProperty function on said first object;
   c. passing one of said association-ends of said association type as a parameter, whereby said getProperty function interprets the definition of the association type that owns the association-end parameter to determine whether it is a valid association type for associating objects of the persistent type defining said first object;
   d. if said getProperty function determines that said association type is valid for said first object's persistent type, said association objects linking said first object to other objects are retrieved; and,
   e. following each linking association instance object to a collection of objects that are associated with said first object via said association instance objects.

10. The method as in claim 6 further comprising the step of returning an empty collection of objects if there are no objects currently associated with said first object.

11. A storage medium encoded with machine-readable computer program code for associating classes contained in models, wherein, when the computer program code is executed by a computer system, the computer performs the steps of:
    a. initializing each persistent type object in one of said models;
    b. for each persistent type object initialized in the preceding step, determining if said persistent type object is an association type, and if so;
    c. creating at least two association-end objects;
    d. adding said association-end objects to a collection of features owned by said persistent type object;
    e. creating association objects that connect objects defined by persistent types associated by one of said association types;
    f. calling a setProperty function to specify an association between a first object and another object;
    g. passing to said setProperty function one of said two association end objects; and,
    h. said setProperty function interpreting the definition of said association type that owns said association-end parameter in order to determine whether:
       i). said association type is a valid association for associating objects of the persistent type which defines said first object;
       ii). said association type is a valid association for associating objects of the persistent type which defines the value object; and,
       iii). if said setProperty function determines that an association can be made, constructing an association instance object to link said first object to said another object.

12. A storage medium as in claim 11 further comprising the step of setting a new value for an association from said first object by submitting a new value object to said setProperty function for said first object, whereby after said setProperty function has returned, said value object that was previously associated with said first object will no longer be associated and said new value will be associated with said first object.

13. A storage medium as in claim 11 or 12 further comprising the step of disassociating another object from all objects to which it is currently associated by submitting a null value parameter to said setProperty function, whereby after said setProperty function has returned, the two objects that were previously associated with said association object will no longer be associated.

14. A storage medium as in claim 11 further comprising the steps of:
    a. creating association objects that connect objects defined by persistent types associated by one of said association types;
    b. calling a setProperty function to specify an association between a first object and a collection of objects;
    c. passing to said setProperty function one of said two association end objects;
    d. said setProperty function interpreting the definition of said association type that owns said association-end parameter in order to determine whether:
       i.) said association type is a valid association for associating objects of the persistent type which defines said first object;
       ii.) said association type is a valid association for associating objects of the persistent type which defines the value objects; and,
       iii.) if said setProperty function determines that an association can be made, constructing association instance objects to link said first object to the said value objects.

15. A storage medium as in claim 11 further comprising the step of setting a new value for an association from said first object by submitting a new collection of value objects to said setProperty function for said first object, whereby after said setProperty function has returned, all objects that were previously associated with said first object will no longer be associated and all objects that were included in said new value collection will be associated with said first object.

16. A storage medium as in claim 11 further comprising the step of disassociating an association object from all objects to which it is currently associated by submitting a null value parameter to said setProperty function, whereby after said setProperty function has returned, all objects that were previously associated with said first object will no longer be associated.

17. A storage medium as in claim 11 further comprising the steps of:
   a. retrieving an object that was associated with said first object;
   b. calling a getProperty function on said first object;
   c. passing one of said association-ends of said association type as a parameter, whereby said getProperty function interprets the definition of the association type that owns the association-end parameter to determine whether it is a valid association type for associating objects of the persistent type defining said first object;
   d. if said getProperty function determines that said association type is valid for said first object's persistent type, said association linking said first object to another object is retrieved;
   e. following said linking association instance object to a third object that is associated with said first object via said association object; and,
   f. returning said third object.

18. A storage medium as in claim 11 further comprising the step of returning an empty collection of objects if there are no objects currently associated with said first object.

* * * * *